(12) United States Patent
Islam

(10) Patent No.: US 7,260,655 B1
(45) Date of Patent: Aug. 21, 2007

(54) OPTICAL ROUTING USING STAR SWITCHING FABRIC WITH REDUCED EFFECTIVE SWITCHING TIME

(75) Inventor: Mohammed N. Islam, Allen, TX (US)

(73) Assignee: Cheetah Omni, LLC, Ann Arbor, MI (US)

( * ) Notice: Subject to any disclaimer, the term of this patent is extended or adjusted under 35 U.S.C. 154(b) by 991 days.

(21) Appl. No.: 10/006,001

(22) Filed: Dec. 3, 2001

(51) Int. Cl.
*G06F 15/16* (2006.01)

(52) U.S. Cl. ........................ 709/252; 398/72

(58) Field of Classification Search ........ 398/101, 398/58, 87, 79, 1, 49, 19, 82, 72; 709/252, 709/224, 216; 359/129, 124, 108; 385/15, 385/24; 370/400, 401, 390
See application file for complete search history.

(56) References Cited

U.S. PATENT DOCUMENTS 3,986,020 A   10/1976   Kogelnik ............... 250/199

(Continued)

FOREIGN PATENT DOCUMENTS

| EP | 0 412 220 A1 | 8/1989 |
|---|---|---|
| EP | 0 439 646 A1 | 1/1990 |
| EP | 0 419 840 A2 | 8/1990 |
| EP | 0 667 690 A2 | 1/1995 |
| JP | 2-278132 | 11/1990 |
| JP | 6-350563 | 12/1994 |
| JP | 8-163048 | 6/1996 |
| JP | 9-326780 | 12/1997 |
| WO | 98/05995 | 12/1998 |
| WO | 99/22496 | 5/1999 |
| WO | 99/56433 | 11/1999 |
| WO | 00/05832 | 2/2000 |
| WO | 03/15368 A2 | 1/2001 |
| WO | 01/18576 A1 | 3/2001 |

OTHER PUBLICATIONS

Bandpass response of collinear beam acousto-optic tunable filters Chang, I.C.; Xu, J.; Wo, D.; Ultrasonics Symposium, 1997. Proceedings., 1997 IEEE vol. 1, Oct. 5-8, 1997 pp. 745-748 vol. 1.*

(Continued)

*Primary Examiner*—Thong Vu
(74) *Attorney, Agent, or Firm*—Baker Botts L.L.P.

(57) ABSTRACT

In one embodiment, a router includes a star switching fabric operable to receive a plurality of optical signals each having a wavelength and each associated with a payload received by the router and to communicate from the switching fabric a plurality of substantially similar sets of the optical signals. The router further includes a plurality of tunable filters each having a configuration speed and each associated with a communication path coupled to one of a plurality of destination elements. Each filter is operable to receive one of the sets of optical signals from the switching fabric and to selectively tune to a wavelength of one of the plurality of optical signals received to facilitate communication of at least the payload associated with that optical signal toward the destination element associated with that filter. The router also includes a plurality of line cards operable to facilitate generation of at least some of the optical signals for transmission to the star switching fabric. At least one of the plurality of line cards includes a switching enhancer operable to increase the switching speed of the router without modifying the configuration speed of any of the tunable filters.

12 Claims, 16 Drawing Sheets

U.S. PATENT DOCUMENTS

| | | | |
|---|---|---|---|
| 4,797,879 A | 1/1989 | Habbab et al. | 370/3 |
| 4,873,681 A | 10/1989 | Arthurs et al. | 370/3 |
| 4,941,747 A | 7/1990 | Dakin | 356/346 |
| 4,970,714 A | 11/1990 | Chen et al. | 370/17 |
| 5,005,167 A | 4/1991 | Arthurs et al. | 370/4 |
| 5,063,612 A | 11/1991 | McKeown | 455/607 |
| 5,093,743 A | 3/1992 | Eng et al. | 359/578 |
| 5,103,340 A | 4/1992 | Dono et al. | 385/46 |
| 5,140,655 A | 8/1992 | Bergmann | 359/120 |
| 5,191,626 A | 3/1993 | Stern | 385/24 |
| 5,206,638 A | 4/1993 | McKeown | 340/825.51 |
| 5,257,113 A | 10/1993 | Chen et al. | 358/426 |
| 5,301,052 A | 4/1994 | Audouin et al. | 359/124 |
| 5,343,542 A | 8/1994 | Kash et al. | 385/31 |
| 5,361,254 A | 11/1994 | Storck et al. | 370/57 |
| 5,452,115 A | 9/1995 | Tomioka | 359/123 |
| 5,455,699 A | 10/1995 | Glance et al. | 359/125 |
| 5,455,701 A | 10/1995 | Eng et al. | 359/135 |
| 5,485,297 A | 1/1996 | Sotom | 359/123 |
| 5,500,858 A | 3/1996 | McKeown | 370/60 |
| 5,506,712 A | 4/1996 | Sasayama et al. | 359/123 |
| 5,515,361 A | 5/1996 | Li et al. | 370/15 |
| 5,519,526 A | 5/1996 | Chua et al. | 359/152 |
| 5,521,732 A | 5/1996 | Nishio | 359/120 |
| 5,530,575 A * | 6/1996 | Acampora et al. | 398/58 |
| 5,539,559 A | 7/1996 | Cisneros et al. | 359/117 |
| 5,550,666 A * | 8/1996 | Zirngibl | 398/72 |
| 5,600,466 A * | 2/1997 | Tsushima et al. | 398/79 |
| 5,729,527 A | 3/1998 | Gerstel et al. | 370/228 |
| 5,739,935 A * | 4/1998 | Sabella | 398/50 |
| 5,739,945 A | 4/1998 | Tayebati | 359/291 |
| 5,781,537 A | 7/1998 | Ramaswami et al. | 370/254 |
| 5,793,746 A | 8/1998 | Gerstel et al. | 370/228 |
| 5,796,504 A | 8/1998 | Sonderegger et al. | 359/154 |
| 5,825,949 A | 10/1998 | Choy et al. | 385/24 |
| 5,847,852 A | 12/1998 | Domon et al. | 359/118 |
| 5,864,414 A | 1/1999 | Barnsley et al. | 359/125 |
| 5,886,313 A | 3/1999 | Krause et al. | 219/121.6 |
| 5,889,600 A | 3/1999 | McGuire | 359/128 |
| 5,915,054 A | 6/1999 | Ota | 385/46 |
| 5,923,644 A | 7/1999 | McKeown et al. | 370/230 |
| 5,926,299 A | 7/1999 | Bayart et al. | 359/121 |
| 5,949,801 A | 9/1999 | Tayebati | 372/20 |
| 5,987,040 A * | 11/1999 | Nesset et al. | 372/8 |
| 6,014,237 A * | 1/2000 | Abeles et al. | 398/87 |
| 6,025,944 A | 2/2000 | Mendez et al. | 359/136 |
| 6,025,950 A | 2/2000 | Tayebati et al. | 359/244 |
| 6,041,071 A | 3/2000 | Tayebati | 372/64 |
| 6,085,233 A * | 7/2000 | Jeffrey et al. | 709/216 |
| 6,097,533 A | 8/2000 | Atlas | 359/337 |
| 6,108,112 A | 8/2000 | Touma | 359/110 |
| 6,108,311 A | 8/2000 | Ramaswami et al. | 370/258 |
| 6,147,786 A | 11/2000 | Pan | 359/124 |
| 6,192,173 B1 | 2/2001 | Solheim et al. | 285/24 |
| 6,212,182 B1 | 4/2001 | McKeown | 370/390 |
| 6,285,810 B1 * | 9/2001 | Fincato et al. | 385/24 |
| 6,301,274 B1 | 10/2001 | Tayebati et al. | 372/20 |
| 6,323,975 B1 * | 11/2001 | Kurki | 398/9 |
| 6,356,544 B1 | 3/2002 | O'Connor | 370/353 |
| 6,377,730 B1 * | 4/2002 | Bergmann et al. | 385/39 |
| 6,388,782 B1 * | 5/2002 | Stephens et al. | 398/79 |
| 6,417,944 B1 * | 7/2002 | Lahat et al. | 398/79 |
| 6,459,516 B1 * | 10/2002 | Mizrahi et al. | 398/82 |
| 6,522,435 B1 * | 2/2003 | Chang et al. | 398/49 |
| 6,525,850 B1 | 2/2003 | Chang et al. | 359/124 |
| 6,563,615 B2 * | 5/2003 | Milton et al. | 398/1 |
| 6,594,268 B1 * | 7/2003 | Aukia et al. | 370/400 |
| 6,718,080 B2 * | 4/2004 | Ofek et al. | 385/15 |
| 6,826,368 B1 | 11/2004 | Koren et al. | 398/50 |
| 6,943,925 B1 * | 9/2005 | Islam | 359/108 |
| 2002/0064165 A1 * | 5/2002 | Boroditsky et al. | 370/401 |
| 2002/0143926 A1 * | 10/2002 | Maltz et al. | 709/224 |
| 2002/0191250 A1 * | 12/2002 | Graves et al. | 359/128 |
| 2002/0196491 A1 * | 12/2002 | Deng et al. | 359/124 |
| 2003/0215231 A1 * | 11/2003 | Weston-Dawkes et al. | 398/19 |
| 2004/0213229 A1 * | 10/2004 | Chang et al. | 370/390 |

OTHER PUBLICATIONS

Integrated acousto-optic tunable filters in LiNbO3 for blue-green spectral region Tsai, C.S.; Matteo, A.M.; Ultrasonics Symposium, 1997. Proceedings., 1997 IEEE vol. 1, Oct. 5-8, 1997 pp. 739-743 vol. 1.*

High strain-induced wavelength tunability in tapered fibre acousto-optic filters Diez, A.; Kakarantzas, G.; Birks, T.A.; Russell, P.St.J.; Electronics Letters vol. 36, Issue 14, Jul. 6, 2000 pp. 1187-1188.*

Islam, "Optical Routing Using a Star Switching Fabric," U.S. Appl. No. 10/653,525, currently pending, 70 pages, Sep. 2, 2003.

Arthurs et al., "HYPASS: An Optoelectronic Hybrid Packet Switching System," IEEE Journal on Selected Areas in Communications, vol. 6, No. 9, pp. 1500-1510, Dec. 1988.

Chen et al., "A Media-Access Protocol for Packet-Switched Wavelength Division Multiaccess Methropolitan Area Networks," IEEE Journal on Selected Areas in Communications, vol. 8, No. 6, pp. 1048-1057, Aug. 1990.

"39·5 Million-Way WDM Broadcast Network Employing Two Stages of Erbium-Doped Fibre Amplifiers," Electronics Letters, vol. 26, No. 22, pp. 1882-1884, Oct. 25, 1990.

"39·81 Gbit/s, 43·8 Million-Way WDM Broadcast Network with 527 km Range," Electronics Letters, vol. 27, No. 22, pp. 2051-2053, Oct. 24, 1991.

Appleton et al., "Modelling WDM Video Distributive Networks," The Institution of Electrical Engineers, pp. 1-4, 1993.

Agrawal, "Fiber-Optic Communication Systems," A Wiley-Interscience Publication, The Institute of Optics University of Rochester NY, pp. 284-360, 1997.

Ford et al., "Fiber-Coupled Variable Attenuator Using a MARS Modulator," Invited Paper, SPIE, vol. 3226, pp. 86-93, 1997.

Sadot et al., "Tunable Optical Filters for Dense WDM Networks," IEEE Communications Magazine, pp. 50-55, Dec. 1998.

Carena et al., "OPERA: An Optical Packet Experimental Routing Architecture with Label Swapping Capability," Journal of Lightwave Technology, vol. 16, No. 12, pp. 2135-2145, Dec. 1998.

Misawa et al. "WDM Knockout Switch with Multi-Output-Port Wavelength-Channel Selectors," Journal of Lightwave Technology, vol. 16, No. 12, pp. 2212-2219, Dec. 1998.

Sadot et al., "Optical Switching Speed Requirements for Terabit/Sec Packet Over WDM Networks," ECOC, 1999.

Elhanany et al., "A Novel Tbit/sec Switch Architecture for ATM/WDM High-Speed Networks," IEEE/IEICE ATM Workshop, Japan, pp. 97-101, 1999.

Elhanany et al., "Tbit/s switching scheme for ATM/WDM networks," Electronics Letters, vol. 35, No. 1, 2 pages, Jan. 7, 1999.

"A New Architecture for Switch and Router Design," PMC-Sierra, Inc., pp. 1-8, Dec. 22, 1999.

Tsukada et al., "WDM/SCM Broadcast-and-select Architecture for Streaming-media," IEEE, pp. 358-359, 2000.

Pesach et al., "Free-space optical cross-connect switch by use of electroholography," Applied Optics, vol. 39, No. 5, pp. 746-758, Feb. 10, 2000.

Sadot et al., "Optical Switching Speed Requirements for Terabit/Second Packet Over WDM Networks," IEEE Photonics Technology Letters, vol. 12, No. 4, pp. 440-442, Apr. 2000.

Goossen, "MEMS-Based Variable Optical Interference Device," IEEE, Invited MB1, pp. 17-18, Aug. 2000.

Shrikhande et al., "HORNET: A Packet-Over-WDM Multiple Access Metropolitan Area Ring Network," IEEE Journal on Selected Areas in Communications, vol. 18, No. 10, pp. 2004-2016, Oct. 2000.

McKeown, "A quick tutorial on IP Router design," Optics and Routing Seminar, pp. 1-42, Oct. 10, 2000.

McKeown, "How might optics be used in IP routers and the Internet?," Optics and Routing Seminar, pp. 1-36, Oct. 24, 2000.

Chao et al., "An Optical Interconnection Network for Terabit IP Routers," Journal of Lightwave Technology, vol. 18, No. 12, pp. 2095-2112, Dec. 2000.

Elhanany et al., "A Prioritized Packet Scheduling Architecture for Provision of Quality-of-Service in Tbit/sec WDM Networks," IEEE, pp. 695-700, 2000.

Plastow et al., "Tunable lasers key to data-network migration," Lightwave, www.light-wave.com, pp. 148-152, Mar. 2001.

Dhar, "Seamless Optical Scaling: Enabling a Dynamic Network," Fiberoptic Product News, Aug. 2001.

Dhar et al., "Tunable lasers create dynamic networking capabilities," WDM Solutions, pp. 82, 84, 86, and 88, Sep. 2001.

Nowak et al., "Stable supercontinuum generation in short lengths of conventional dispersion-shifted fiber," Department of Electrical Engineering and Computer Science, The University of Michigan, pp. 1-20.

Nowak et al., "Stable 200nm TDM/WDM source based on continuum generation in 2m of fiber," Department of Electrical Engineering and Computer Science, The University of Michigan, pp. 1-13.

"Compariosn of Techniques for Mult-Tb/s TDM/WDM Source," The University of Michigan.

Bayne et al., "Broadcast-and-select OADM enables low-cost transparency," LIGHTWAVE, www.light.wave.com, pp. 69-74, Dec. 2001.

"Corning Discovering Beyond Imagination," Presented at STARTRAX, 13 pages, 2001.

Fernandez et al., "TCP Switching: Exposing Circuits to IP," Stanford University, pp. 1-6.

Walker et al., "Mechanical Anti-Reflection Switch (MARS) Device for Fiber-In-the-Loop Applications," Invited FA1, pp. 59-60.

McKeown, "Fast Switched Backplane for a Gigabit Switched Router," Department of Electrical Engineering, Standford University, CA, pp. 1-30.

"Broadcast and Distribution Networks," 7.1.2, pp. 289-297.

McKeown et al., "The Two-Stage Switch," Leland Stanford Junior University, 12 pages.

Fernandez, "Where Does Circuit Switching Make Sense In the Internet?," High Performance Networking Group, Stanford University, 19 pages.

Pending U.S. Appl. No. 10/004,095, entitled "Optical Routing Using a Star Switching Fabric," by Islam et al., pp. 1-92, filed Dec. 3, 2001.

Pending U.S. Appl. No. 60/336,779, entitled "High Speed MEMS Device," by Islam et al., pp. 1-, filed Dec. 3, 2001.

Pending U.S. Appl. No. 10/005,998, entitled "Method and Apparatus for Scheduling Communication Using a Star Switching Fabric," by Islam, pp. 1-83, filed Dec. 3, 2001.

Pending U.S. Appl. No. 10/004,996, entitled "Broadcast and Select Optical Networking," by Islam et al., pp. 1-63, filed Dec. 3, 2001.

* cited by examiner

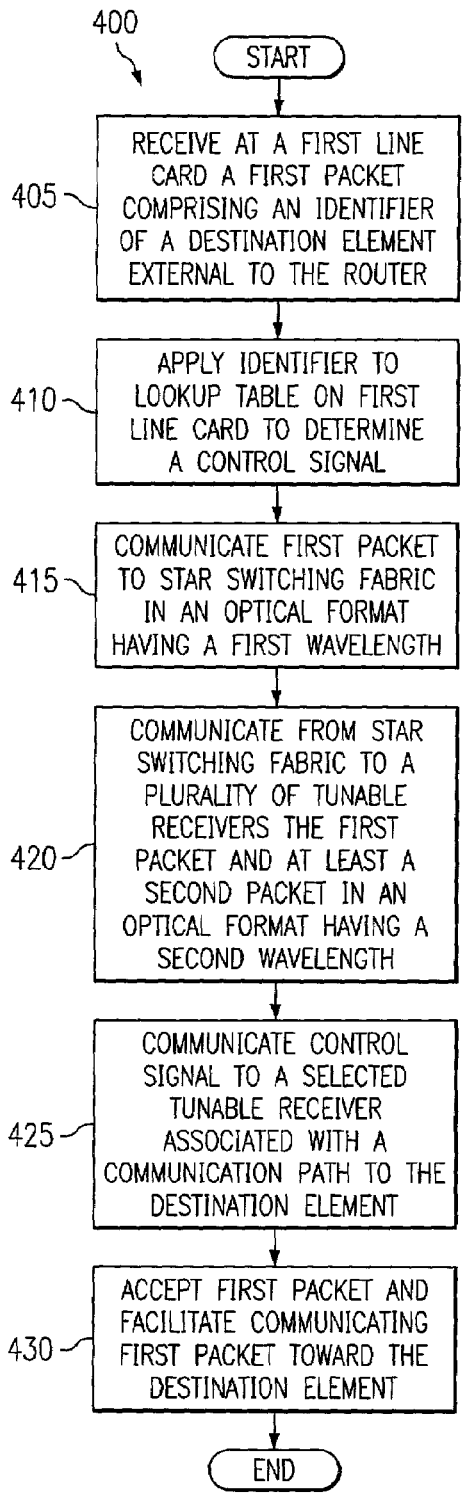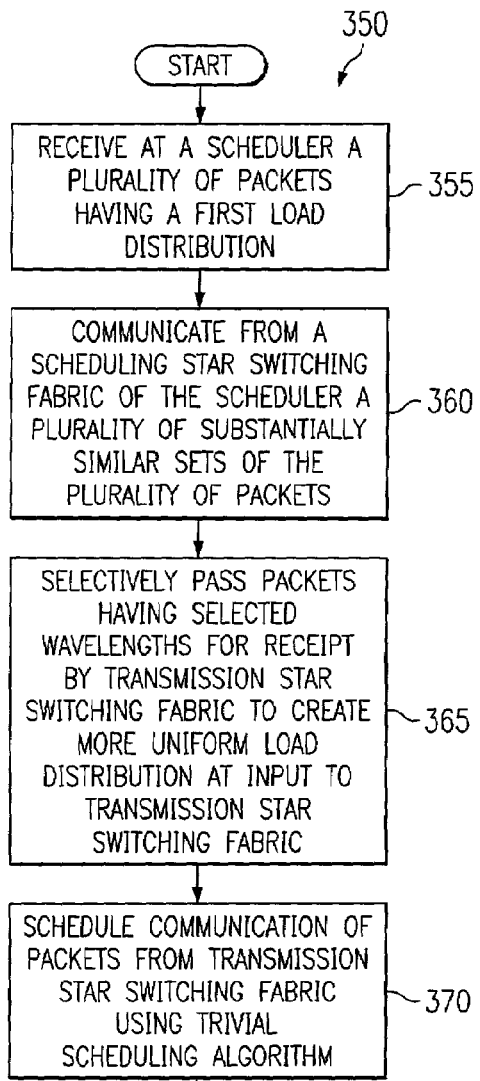
FIG. 10
FIG. 11

OPTICAL ROUTING USING STAR SWITCHING FABRIC WITH REDUCED EFFECTIVE SWITCHING TIME

TECHNICAL FIELD OF THE INVENTION

The present invention relates to the field of communication systems, and more particularly to an apparatus and method operable to facilitate optical routing using a star switching fabric wherein the router exhibits reduced effective switching time.

BACKGROUND

As optical systems continue to increase the volume and speed of information communicated, the need for methods and apparatus operable to facilitate high speed optical signal processing also escalates. Information providers make significant investments in communication equipment only to have that equipment become obsolete as the demand for increased bandwidth quickly swamps the equipment's capacity. Information providers, therefore, value enhancements to existing equipment that can extend the viability of that equipment at a fraction of the cost of replacement.

Overview of Various Example Embodiments

The present invention recognizes a need for a method and apparatus operable to efficiently and effectively facilitate high speed optical routing. At least some aspects of this invention facilitate increasing switching speed, thereby increasing system bandwidth, without the need to completely replace existing system infrastructure. Various aspects of the invention can also be applied to new equipment designs, rendering those designs more cost efficient and desirable to information providers.

In one embodiment, a router comprises a star switching fabric operable to receive a plurality of optical signals each having a wavelength and each associated with a payload received by the router and to communicate from the switching fabric a plurality of substantially similar sets of the optical signals. The router further comprises a plurality of tunable filters each having a configuration speed and each associated with a communication path coupled to one of a plurality of destination elements. Each filter is operable to receive one of the sets of optical signals from the switching fabric and to selectively tune to a wavelength of one of the plurality of optical signals received to facilitate communication of at least the payload associated with that optical signal toward the destination element associated with that filter. The router also comprises a plurality of line cards operable to facilitate generation of at least some of the optical signals for transmission to the star switching fabric. At least one of the plurality of line cards comprises a switching enhancer operable to increase the switching speed of the router without modifying the configuration speed of any of the tunable filters.

In one particular embodiment, the switching enhancer comprises an aggregator operable to combine information from a plurality of packets associated with a common output communication path into an aggregated frame.

In another embodiment, the switching enhancer comprises an optical transmitter operable to receive an electrical signal representing a packet received by the line card having an original duration and to generate a packet representing the received packet but having a shortened duration compared to the original duration.

In still another embodiment, the switching enhancer comprises a plurality of tunable filters associated with a single output optical link from the router and operable to receive one of the sets of optical signals from the star switching fabric. At least one of the plurality of tunable filters is operable to reconfigure while another of the plurality of tunable filters processes a signal received from the star switching fabric.

In yet another embodiment, the switching enhancer comprises a plurality of tunable optical transmitters associated with a single input optical link to the router and operable to generate at a selected wavelength one of the optical signals for transmission to the star switching fabric. At least one of the plurality of tunable transmitters is operable to reconfigure without emitting light while another of the tunable transmitters generates a signal for transmission to the star switching fabric.

In still another embodiment, the switching enhancer comprises an express lane associated with at least one of the plurality of filters, wherein the express lane bypasses all of the plurality of line cards.

Any of these switching enhancing enhancements could be combined with any one or more of the other enhancements to further increase the speed of the router.

Depending on the specific features implemented, particular embodiments may exhibit some, none, or all of the following technical advantages. One embodiment provides one or more novel switching enhancing mechanisms in connection with routing optical signals using a star switching fabric.

In some embodiments, associating a plurality of tunable filters with one or more output links from the router provides an advantage of allowing one or more of the plurality of filters to retune to other wavelengths while another of the plurality processes a signal from the switching fabric. Likewise, in these or other embodiments, associating a plurality of tunable filters with a single input port to the router allows one or more of the plurality of transmitters to retune to other wavelengths while another of the plurality of transmitters generates, based on a signal received at the input port, a signal for transmission to the switching fabric at a different wavelength. These techniques hide switching delays that would otherwise occur when waiting for tunable filters and/or transmitters to reconfigure to process another wavelength.

Implementing express channels can provide significant advantages in avoiding unnecessary processing of particular groups of optical signals that require no electronic signal processing. Aggregation of packets within the router reduces the number of switching operations the tunable elements undertake, further increasing the speed of the router. Similarly, reducing the duration of the packets traversing the router helps speed the router's operation.

Some embodiments use tunable lasers and fixed wavelength transmitters. These embodiments provide an advantage of minimizing cost by implementing low cost tunable filters as compared to relatively higher cost tunable lasers. In addition, implementing tunable filters readily facilitates multicast and/or broadcast operation simply by provisioning a plurality of the tunable filters to receive a particular optical router signal communicated from the switching fabric.

Other technical advantages are readily apparent to one of skill in the art from the attached figures, description, and claims.

BRIEF DESCRIPTION OF THE DRAWINGS

For a more complete understanding of the present invention, and for further features and advantages thereof, reference is now made to the following description taken in conjunction with the accompanying drawings, in which:

FIG. 10 is a flow chart showing one example of a method of routing optical signals using a star switching fabric;

FIG. 11 is a flow chart showing one example of a method of scheduling communications through a star switching fabric;

DETAILED DESCRIPTION OF VARIOUS EXAMPLE EMBODIMENTS

Figure 1:
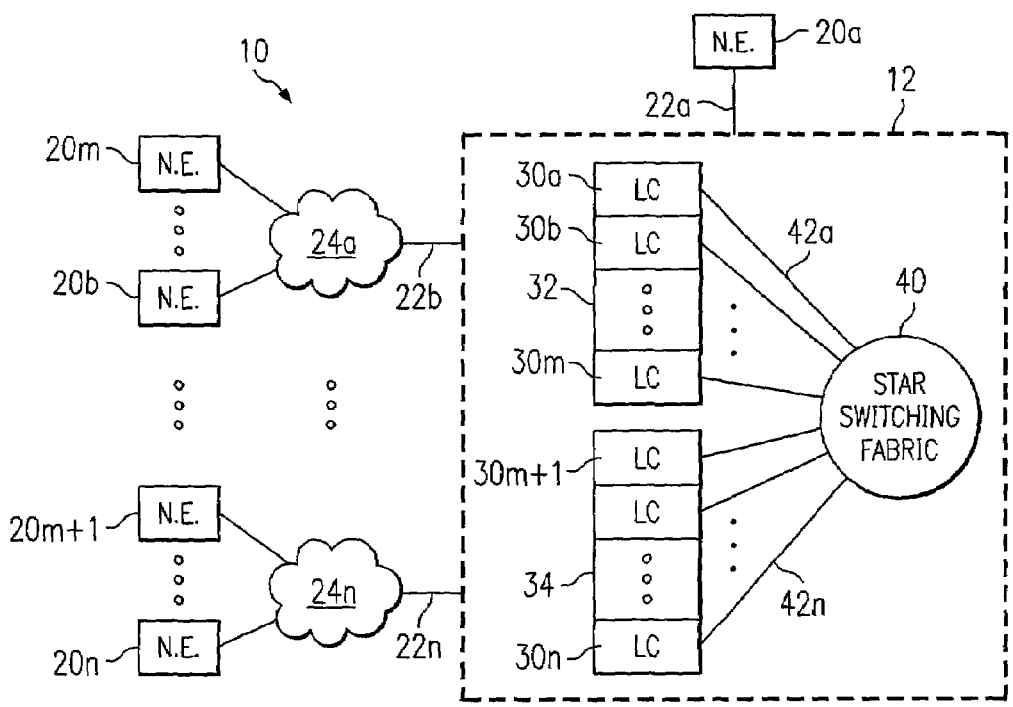
FIG. 1 is a block diagram illustrating an exemplary communication system implementing aspects of the present invention.

FIG. 1 is a block diagram illustrating an exemplary communication system 10 operable to facilitate communication of optical signals. In this example, system 10 includes a router 12 coupled to a plurality of network elements 20a-20n. Router 12 facilitates directing optical communication signals between various elements within and/or coupled to system 10. Throughout this document, the term "coupled" denotes any direct or indirect communication between two or more elements said to be "coupled" to one another. Elements coupled to one another may, but need not, be physically connected to one another. Additional elements may or may not reside between two elements said to be "coupled" to one another.

As used throughout this document, the term "router" refers to any hardware, firmware, software, or combination thereof operable to receive signals from various sources and to direct signals received toward one or more destinations depending at least in part on an identifier associated with the signal and its destination.

In one particular embodiment, signals received by router 12 comprise packets. As used throughout this document, the term "packet" refers to signals having fixed or variable size, each comprising an identifier associated with a destination network element. While some of the packets may comprise traffic terminating at router 12, at least some of the packets contain identifiers identifying destination elements external to router 12. The packets could comprise, for example Internet Protocol (IP) packets or a Transmission Control Protocol (TCP) packets including an address identifying a destination network element. As another example, each incoming optical signal could comprise a Multi-Protocol Label Switching (MPLS) packet or Generalized Multi-Protocol Label Switching (GMPLS) packet comprising a tag identifying a destination network element.

In some cases, the "destination network element" may comprise a node within or coupled to system 10, but external to router 12, to which information in the optical signal is ultimately destined. In other cases, the "destination network element" may comprise a node external to router 12 in a communication path between router 12 and an element to which the information is ultimately destined. In that case, the "destination network element" comprises an intermediate network element facilitating further routing of the information to the ultimate destination network element. In still other cases, router 12 may comprise the destination element.

Network elements 20a-20n communicate optical signals over system 10. Network elements 20 may comprise any hardware, software, firmware, or combination thereof operable to transmit and/or receive information via communication system 10. Router 12 communicates with network elements 20 via communication links 22a-22n. Communication links 22 may comprise, for example, optical fibers. Communication links 22a-22n could, however, comprise any land based or space based communication medium, or combination of such media operable to communicate one or more optical signals.

Network elements 20 can couple directly to communication links 22, or may couple to communication links 22 through one or more networks 24. Each of networks 24 could comprise, for example, a data network, a public switched telephone network (PSTN), an integrated services digital network (ISDN), a local area network (LAN), a wide area network (WAN), or other communication system or combination of communication systems at one or more locations. Networks 24 may comprise wireless networks, wireline networks, or combinations of wireless and wireline networks. Network elements 20 and/or router 12 can reside with networks 24 or externally to those networks.

In this particular example, router 12 comprises a plurality of line cards 30a-30n. As used throughout this document, the term "line card" can include any hardware, software, firmware, or combination thereof operable to receive incoming optical signals from communication links 22 and to convert at least a portion of at least some of the incoming optical signals to electrical signals to facilitate electronic decision making with respect to those signals. In the illustrated embodiment, each line card 30 is associated with an optical transmitter operable to generate, based at least in part on the electrical signals received, an optical router signal for transmission within router 12. The optical transmitters may comprise, for example, laser diodes, light emitting diodes, or other light emitting sources.

Line cards 30 may reside in one or more physically separate locations. In this particular example, a first plurality of line cards 30a-30m reside in a first rack 32, while a second plurality of line cards 30m+1-30n reside in a second rack 34. As one specific example, first rack 32 and second rack 34 may each hold sixteen line cards 30. Additional or fewer numbers of line cards and numbers of racks could be used without departing from the scope of the invention.

In this example, racks 32 and 34 are physically separated from one another. In one embodiment, racks 32 and 34 may be separated by a distance where communication speed considerations make it desirable to implement optical communication between racks 32 and 34. Line cards 30 in racks 32 and 34 advantageously use optical communication links 42a-42n to facilitate high speed communication. In this particular example, optical communication links 42a-42n interconnect through an optical switching fabric 40.

Switching fabric 40 comprises hardware, software, firmware, or combinations thereof operable to facilitate directing optical router signals between line cards 30 and/or express channels (not explicitly shown in this figure), which bypass line cards 30. In a particular example, switching fabric 40 comprise a star switching fabric. Throughout this document, the term "star switching fabric" refers to a device and/or functionality operable to receive a plurality of input optical signals from a plurality of sources and to communicate a substantially similar set of at least some of the input optical signals to each of a plurality of destinations. In one particular embodiment, star switching fabric 40 resides within one of racks 32 or 34.

In the example illustrated in FIG. 1, switching fabric 40 could comprise a star switching fabric operable to receive a plurality of input optical router signals from plurality of line cards 30 and to communicate substantially similar sets each comprising at least some of the input optical router signals back to at least some of the plurality of line cards 30 and/or express channels bypassing line cards 30. Fused fiber couplers, waveguide star couplers, arrayed waveguide gratings, power splitters, wavelength division multiplexers, cascaded 2×2 couplers, n×n couplers and cascades of these couplers are just a few examples of devices that could form star switching fabric 40.

In a particular embodiment, switching fabric 40 advantageously interconnects line cards 30 residing within different racks 32 and 34, and facilitates communicating optical router signals between line cards 30 without requiring electrical-to-optical or optical-to-electrical signal conversions within switching fabric 40. This design can increase the speed of the router, and could also reduce the physical size, power dissipation, and cost of the router. In one particular embodiment, switching fabric 40 could occupy less than one third of the space of rack 32 or 34, leaving substantial room for additional line cards and other processing elements.

In one example embodiment, router 12 includes a plurality of tunable filters. A tunable filter can comprise any hardware, software, and/or firmware operable to selectively substantially communicate one or more wavelengths of light while substantially rejecting other wavelengths of light. In this example, each tunable filter is associated with one of line cards 30 or with an express channel.

Each tunable filter is operable to receive a plurality of optical signals and to select one or more signals for processing by tuning to a wavelength associated with the selected signals. The use of tunable filters in router 12 advantageously facilitates efficient multicast and/or broadcast operation simply by tuning multiple filters, each associated with a separate line-card or express channel, to a common wavelength.

In operation, router 12 receives a plurality of input optical signals from communication links 22. One or more optical links can carry signals at wavelengths designated as express channels within router 12. Express channels route directly through switching fabric 40 from inputs of router 12 to outputs of router 12, bypassing line cards 30.

With respect to non-bypass traffic, line cards 30 receive at least some of the input optical signals and convert all or a portion of those signals to an electronic format to facilitate electronic decision making processing. As one particular example, one or more line cards 30 receive packets and convert at least a destination identifier portion of the packet into an electronic format. Line cards 30 then use the electronic destination identifier information to assist in directing the packet to a destination network element.

Optical transmitters associated with line cards 30 generate input optical router signals based at least in part on processing of the electronic signals. Router 12 communicates the input optical router signals and any bypass traffic to switching fabric 40, where a plurality of input optical router signals and any bypass traffic are combined to form an output optical router signal. The output optical router signal comprises information from some or all of the plurality of input optical router signals and/or express channel signals.

Switching fabric 40 facilitates communicating the output optical router signal to at least some of a plurality of tunable filters, each associated with an output link from router 12. Tunable filters receive the output optical router signal and tune to a selected wavelength associated with a portion of the output optical router signal destined for a line card 30 associated with that filter or an express channel output link associated with that filter. The selected portion of the output optical router signal can carry the packet bound for the destination network element.

Where a line card 30 is associated with the tunable filter, the line card facilitates communication of the received packet from the associated filter to the destination network element. This may include, for example, passing the packet in optical form to an output communication link, or converting the packet to an electrical format for further processing within router 12. Router 12 may also perform wavelength conversion prior to passing the signals toward the destination network element.

Figure 2:
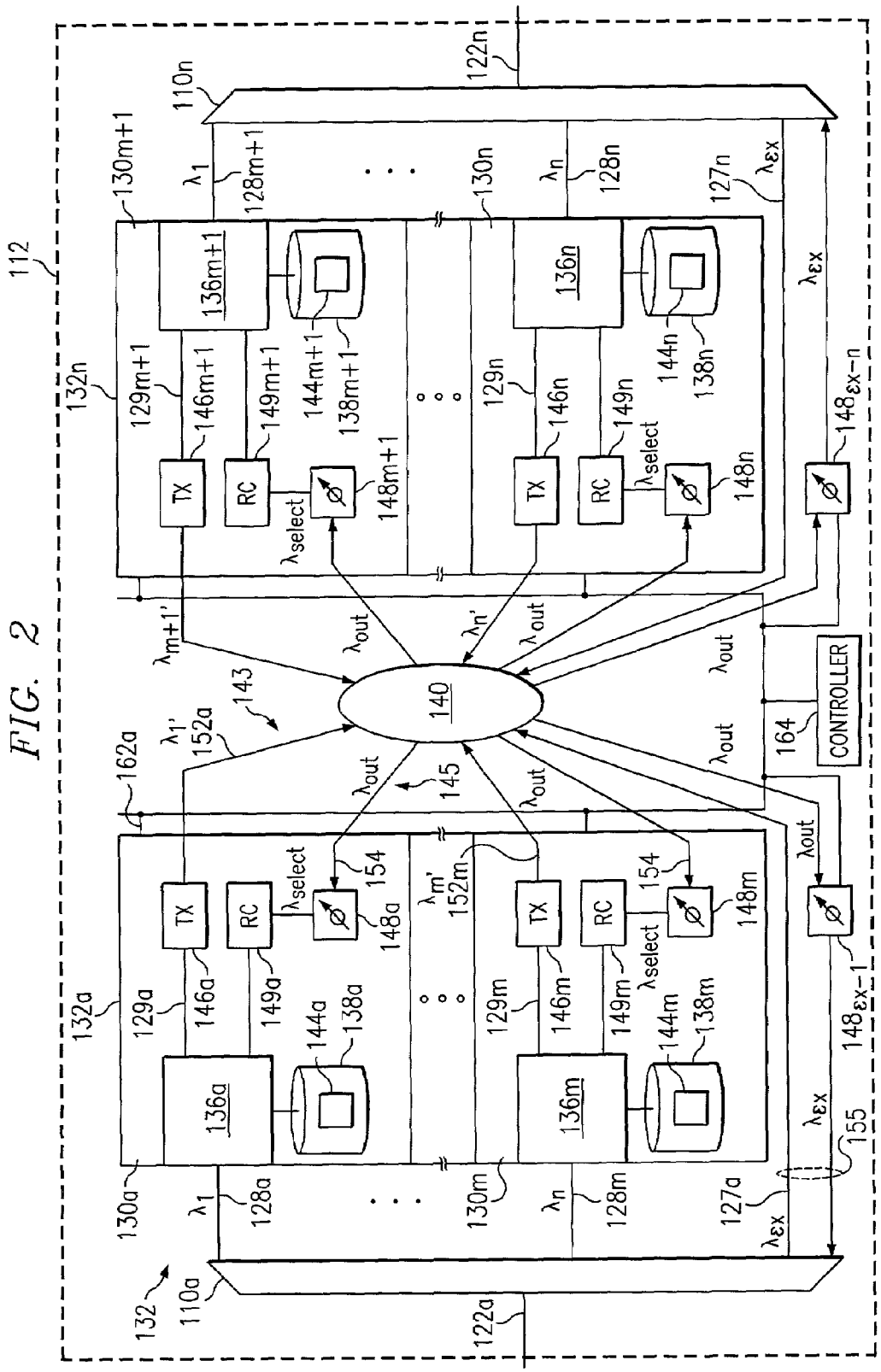
FIG. 2 is a block diagram of one example embodiment of an optical implementing aspects of the present invention.

FIG. 2 is a block diagram of one particular embodiment of router 112. In this example, router 112 includes a plurality of wavelength division multiplexer/demultiplexers (WDM) 110a-110n. Each WDM is associated with one or more optical links 122 carrying wavelength division multiplexed optical signals. Wavelength division multiplexers/demultiplexers 110 receive incoming WDM signals from optical links 122 and separate the incoming signal into a plurality of channels $\lambda_1$-$\lambda_n$ for processing within line cards 130. On the output side, wavelength division multiplexers/demultiplexers 110 combine a plurality of signals into one or more multiple wavelength output signals.

In this particular example, incoming signals received at links 122 also include one or more express channels $\lambda_{Ex}$, which traverse router 112 over bypass links 155 without being processed by line cards 130. Express channels $\lambda_{Ex}$ are communicated directly to switching fabric 140 without any optical-to-electrical conversion. Implementing express channels can provide significant advantages in avoiding unnecessary processing of particular groups of optical signals. Although this example shows just one express link, any number of express links could be provided. Traffic entering router 12 can be divided between processed traffic and express traffic, for example, by designating particular wavelengths in WDM signals 122 accordingly.

In the illustrated embodiment, router 112 comprises a plurality of racks 132a-132n of line cards 130 each coupled to a switching fabric 140. In this example racks 132a and 132n are physically separated from one another and switching fabric 140 serves as an all-optical interconnect between line cards 130 in racks 132a and 132n. In other embodiments, all line cards 130 could reside locally to one another, for example, in a single rack.

In the illustrated example, each line card 130 includes a processor 136. Alternatively, some of all of line cards 130 could share central processing resources accessible to line cards 130. In any case, processor or processors 136 operate to convert at least a portion of an input optical signal 128 arriving from one of communication links 22 to an electrical format. For example, input optical signal 128 may comprise a packet having a destination identifier, such as a TCP address, an IP address or, an MPLS or GMPLS tag. Processor 136 operates to convert at least the destination identifier portion of the packet to an electrical format to facilitate electronic decision making functions with respect to that packet.

In this example, each line card 130 comprises a memory 138. Memory 138 may comprise any hardware, software, and/or firmware operable to facilitate storage and/or retrieval of electronic information. Although in this example memory 138 is shown as residing entirely within line card 130, all or a portion of memory 138 could alternatively reside at another location remote from but accessible to line card 130.

Each memory 138 stores a look-up table 144 operable to facilitate electronic decision making to result in communicating incoming optical signals 128 from router 112 toward destination network elements residing externally to router 112. Look-up table 144 may comprise any data structure, compilation, or other arrangement of information facilitating generation of instructions based at least in part on information contained in a signal to be routed. As one particular example, using an identifier of the destination element from a received packet, processor 136 may index look-up table 144 to obtain instructions on directing the packet through router 112 and toward the destination element. Look-up table 144 can, for example, facilitate TCP/IP routing based on an address associated with the destination element. Alternatively, look-up table 144 can facilitate label switching based on an MPLS or GMPLS routing protocol.

In some cases, router 112 may comprise an edge router facilitating communication of packet traffic received in one format through a subnetwork operating with another format. For example, router 112 could receive IP or TCP packets from an IP network and convert those packets to an MPLS or GMPLS format for transmission through a label switching portion of a network. In that case, the packets traversing switch fabric 140 would comprise MPLS or GMPLS packets.

Each line card 130a-130n further comprises an optical transmitter 146a-146n operable to receive an electronic signal 129a-129n and to generate an input optical router signal 152a-152n, respectively, based at least in part on the received electronic signal 129a-129n. Each optical transmitter may comprise, for example, a laser diode, although any optical transmitter could be used without departing from the scope of the invention. Optical transmitters 146 may comprise directly modulated or externally modulated lasers. Alternatively, one or more of optical transmitters 146 may comprise lasers having integrated modulators, such as electro-absorbtion modulators.

In one particular embodiment, each optical transmitter 146 comprises a fixed wavelength laser. Throughout this document, the term "fixed wavelength laser" denotes a laser operable to generate optical signals at approximately one predetermined wavelength or range of wavelengths, and which does not during operation perform selective adjustment of the output wavelength. Lasers whose output wavelength varies during operation due to, for example, fluctuations in environmental conditions are not intended to be excluded from the definition of a "fixed wavelength" laser. Moreover, tunable lasers operated without intentionally selectively varying the output wavelength of the laser during operation are intended to be within the definition of a "fixed wavelength" laser.

Although some embodiments of the invention implement tunable lasers, using fixed wavelength lasers 146 provides an advantage of reducing cost and complexity of router 112 compared to solutions requiring tunable lasers. In addition, one aspect of the invention recognizes that using fixed wavelength lasers, each transmitting at a different wavelength, reduces or eliminates collisions in the switching fabric.

In this example, each optical link 128 is associated with a tunable filter. In the illustrated embodiment, each of line cards 130a-130n includes a tunable filter 148a-148n, respectively. Each express channel 127 also includes a tunable filter 148ex1-148exn. Tunable filters 148 may each comprise, for example, a tunable optical filter operable to selectively communicate particular optical router signals 152 from output optical router signal 154. As one example, tunable filters 148 could each comprise a Fabry Perot interferometric device. In a particular embodiment, the filter could comprise a micro-electromechanical switch (MEMS) device capable of tuning at speeds faster than once each one hundred nanoseconds.

Although many other tunable filter designs could be implemented without departing from the scope of this disclosure, the following provides a brief description of one such device.

A Fabry Perot interferometric micro electromechanical switching (MEMS) device typically implements a stationary mirror structure and a moveable mirror structure, which form between them an optical cavity having a depth that can be selectively altered by applying a force to the moveable mirror structure. In one particular novel design, the moveable mirror structure can be supported by actuators surrounding the moveable mirror structure.

The actuators can comprise, for example, a stationary conductor and a moveable conductor, which form between them an electrode gap. A voltage difference applied between the two conductors creates an electrostatic force tending to move the moveable conductor toward the stationary conductor.

The actuators can be placed in symmetric locations around the moveable mirror and coupled to the moveable mirror. Locating the actuators around the mirror facilitates independent selection of the nominal optical cavity depth and the electrode gap depth. Thus, this design facilitates optimizing both the optical characteristics of the interferometer through selection of the optical cavity depth, and separate optimization of the electrical characteristics of the device through independent selection of the electrode gap depth. Moreover, by forming the interferometer and actuators in this manner, the dimensions of the moveable conductor can be optimized to provide high speed and low drive voltage.

In some embodiments, the moveable mirror assembly of the interferometer can be supported by a frame that substantially surrounds and/or covers the moveable mirror. The frame and location of the actuators help to avoid deformation of the moveable mirror structure during actuation, resulting in better optical characteristics for the device. Although details of one particular tunable filter have been described here, other tunable filter designs could be used. Other MEMs designs, lithium niobate tunable filters, and liquid crystal tunable filters provide a few examples.

Line cards 130 can also include a converter 149 operable to convert the recognized portion 152 of output optical router signal 154 into an electrical signal 129 for further processing within router 112.

Router 112 includes a control network 160 operable to communicate control signals 162 to facilitate selection of a communication path through router 112 and on to the destination element. In one embodiment, control signals 162 direct tunable filters 148 to tune to a specified wavelength or range of wavelengths to facilitate selection of an appropriate optical router signal 152 from multiple wavelength output optical router signal 154. As a particular example, control network 160 could comprise an Ethernet. Although other control network configurations could be used without departing from the scope of the invention, an Ethernet provides an advantage of efficient and economical operation at speeds sufficient to control and reset filters 148 between receipt of sequential optical router signals.

In an alternative embodiment, control network 160 could comprise a plurality of control lasers each operable to generate and communicate to filters 148 an optical control signal 162 at, for example a designated control frequency. In this embodiment optical control signals are communicated via switching fabric 140. Router 112 may, for example, communicate control signals to filters 148 prior to communicating optical router signals to filters 148. In that way, filters 148 can be provisioned to accept selected optical router signals 152 depending on the state of an optical control signal 162.

Router 112 may include a scheduler 164 coupled to control network 160. Scheduler 164 can operate to provide scheduling functionality to avoid or reduce contention in transmission of control signals 162 to filters 148. FIGS. 5a-5d discussed below provide details of example scheduling mechanisms useful with any star switching fabric, including the design discussed herein with respect to FIGS. 2 and 3.

Router 112 interconnects line cards 130 using switching fabric 140 including communication links 143 and 145. Communication links 143 couple lasers 146 to switching fabric 140, while communication links 145 couple filters 148 to switching fabric 140. In this example, communication links 143 and 145 comprise single mode fibers.

In operation, wavelength division multiplexer/demultiplexers 110 receive one or more multiple wavelength signals 122 and separate input signals 128a-128n including express channels 127 from one another. Express channels 127a-127n are directed to switching fabric 140 without performing optical-to-electrical conversions on those signals.

Processor(s) 136 associated with line cards 130 receive input optical signals 128a-128n and converts at least a portion of each signal to an electronic format. In one embodiment, processor(s) 136 can operate to convert to an electronic form the entire contents including the header and payload portions of incoming optical signal 128. Processor(s) 136 apply at least a destination identifier portion of the electronic signal 129 to look-up table 138 to determine communication instructions for the signal. Optical transmitter 146 can then form an optical router signal 152 by transforming electronic information into optical router signal 152.

In another embodiment, processor(s) 136 may convert only a header portion of input optical signal 128 to electronic form leaving the payload portion in optical form. In that case, processor(s) 136 may perform electronic processing on the header to determine routing of the signal, and then pass the header or a modified version thereof to optical transmitter 146. In that embodiment, optical transmitter 146 produces an optical header, which is then combined with the optical payload portion of the signal to form an optical router signal for transmission through switching fabric 140. In that embodiment, the portion of the input optical signal that is not converted to an electronic format can be passed through a delay element, such as a buffer or a delay line, to facilitate delay while the identifier portion of the packet is electronically processed.

Each optical transmitter 146 communicates to switching fabric 140 an optical router signal 152 at a particular wavelength. Where optical transmitters 146 comprise fixed wavelength lasers, each optical transmitters 146 transmits its optical router signal 152 at a predetermined specified wavelength associated with that particular transmitter 146, which is different from wavelengths transmitted from other transmitters 146. Where optical transmitters 146 comprise tunable lasers, each laser communicates its optical router signal 152 at a wavelength determined by a control signal from, for example, processor 136.

In this particular embodiment, each processor 136 determines a control signal 162 based at least in part on applying a destination identifier to the look-up table 144 associated with that line card 130. In some embodiments control signal 162 may identify an output communication link 128 coupling to the destination network element. In other cases, control signal 162 may identify a filter 148 associated with the identified output link 128. Router 112 communicates control signals 162 via control circuitry 160 to tunable lasers 146 and/or tunable filters 148 to selectively enable communication paths through router 112.

Transmitters 146 each communicate an optical router signal 152 to switching fabric 140. In this particular example, switching fabric 140 comprises a star coupler switching fabric. Star coupler switching fabric 140 receives a plurality of optical router signals 152 and may also receive one or more express channels 127 each having substantially different wavelengths. Switching fabric 140 combines information from at least some of the optical router signals 152 and/or at least some of the express channels 127 into an output optical router signal 154. Each output optical router signal 154 comprises a substantially similar set of optical router signals 152 and/or express channels 127. Star switching fabric communicates optical router signal 154 to some or all of filters 148.

In a particular embodiment, transmitters 146 comprise fixed wavelength lasers while filters 148 comprise tunable filters. This embodiment provides an advantage of minimizing cost by implementing low cost tunable filters as compared to relatively higher cost tunable lasers. In addition, implementing tunable filters readily facilitates multicast and/or broadcast operation simply by provisioning the tunable filters to receive a plurality of the optical router signals communicated from switching fabric 140.

In this example, router 112 communicates control signals 162 to scheduler 164 and/or to a tunable filter 148 associated with a communication path leading to the destination network element. Filters 148 receive control signals 162 and selectively tune to receive particular wavelengths as directed by control signals 162. In this manner, tunable filters 148 selectively receive only the portion of output optical router signal 154 communicated from switching fabric 140 that is intended for further transmission toward the destination element.

In an alternative embodiment, transmitters 146 may comprise tunable optical lasers. In that embodiment, lasers 146 may receive control signals 162 and communicate optical router signals 152 to switching fabric 140 at selected wavelengths predetermined to match wavelengths of filters 148 associated with communication paths leading to the destination network elements.

Filters 148 receive specified portions of output optical router signal 154 corresponding to the packet desired for transmission to the destination network element. In one embodiment, each filter 148 comprises an optical filter operable to communicate only optical router signals having a specified wavelength. In a particular embodiment, the received optical router signal can be communicated without further processing in router 112 to the destination network element. In another embodiment, each line card 130 may also include a converter 149 operable to convert an optical router signal received from an associated filter 148 to an electronic format for further processing within router 112 before conversion back to an optical format to be communicated toward the destination network element.

Figure 3:
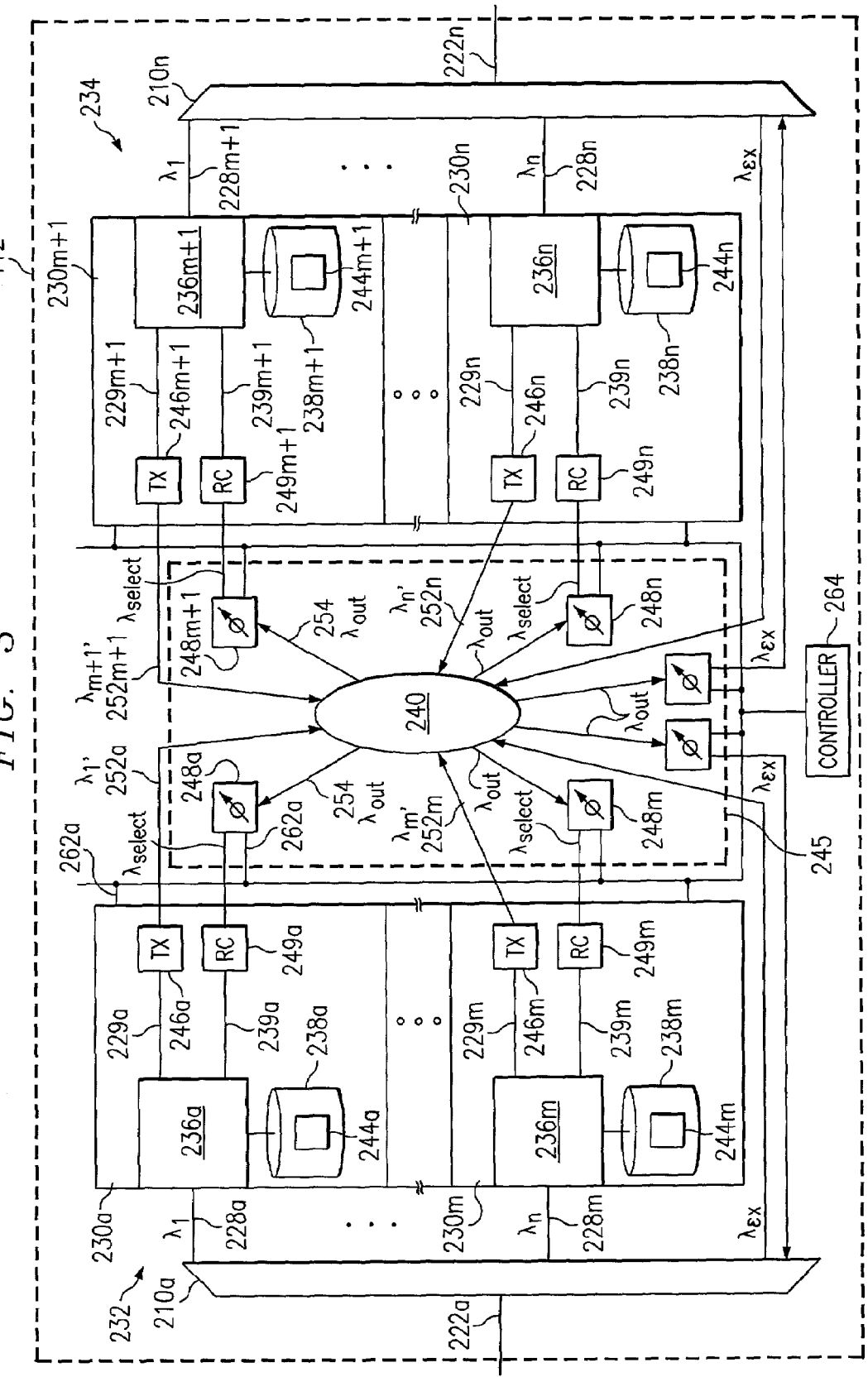
FIG. 3 is a block diagram of another example embodiment of an optical implementing aspects of the present invention.

FIG. 3 is a block diagram illustrating another embodiment of a router 212. Router 212 is similar in structure and function to router 112 shown in FIG. 2, except that in this case, tunable filters 248 reside remotely from line cards 230 and in close proximity to or integrally with switching fabric 240.

Router 212 includes a plurality of line cards 230 each associated with an optical transmitter 246 and a tunable filter 248. Each line card 230 is coupled to a switching fabric 240 via communication links 243 and 245. Switching fabric 240 operates to receive a plurality of input optical router signals 252a-252n from optical transmitters 246a-246n and one or more express channel signals 227 and to generate an output optical router signal 254 comprising information from at least some of the input optical router signals 252a-252n and/or express channel signals 227.

In one particular embodiment, optical transmitters 246 comprise fixed wavelength transmitters each operable to generate a particular wavelength signal. In this embodiment, filters 248 each comprise a tunable optical filter operable to receive multiple signals each having different wavelengths and to tune to receive only a selected wavelength signal in response to a control signal 262. In this example, tunable filters 248 selectively tune to a particular wavelength or range of wavelengths based on control signal 262 from control network 260. Control network 260 may comprise, for example, an Ethernet or other suitable network or combination of communication links operable to communicate an electronic control signal 262. Alternatively, control network 260 could comprise control lasers operable to communicate optical control signals 262 via switching fabric 240.

In this embodiment, optical transmitters 246 reside on their associated line cards 230, while tunable filters reside remotely from line cards 230. In this example, tunable filters 248 and switching fabric 240 comprise a router core 245 for router 256. In this embodiment, router core 245 includes switching fabric 240 combined with closely coupled tunable filters 248. Removing tunable filters 248 from line cards 236 and integrating those filters into router core 245 can provide significant advantages. For example, removing tunable filters 248 from line cards 236 provides additional space on each line card for other processing elements, or facilitates reducing the physical size of each line card. This allows for additional line cards to reside in any given rack. Moreover, integrating filters 248 within router core 245 at or near switching fabric 240 facilitates the use of arrays of filters, rather than individually packaged filters for each channel. Coupling switching fabric 240 to an array of tunable filters can significantly reduce packaging costs and, thus, the overall cost of the router.

Filters 248, in this example, are coupled to switching fabric 240 using optical connections 255. Each optical connection 255 may comprise, for example, a short length of fiber or a planar waveguide. In the illustrated embodiment, each of communication links 243 coupling optical transmitters 246 to switching fabric 240 comprises a single mode fiber. Communication links 245 coupling filters 248 to line cards 230 may comprise single mode or multi-mode fibers. Communication networks using star couplers have traditionally used single mode fibers to couple network elements both to and from the star coupler. One aspect of the invention recognizes that in certain embodiments, such as where filters 248 reside remotely from line cards 230, the use of multimode fibers to couple one or more filters 248 to associated line cards 230 can provide an advantage of reducing cost of router 212 without significantly degrading performance of the device.

Figure 4A:
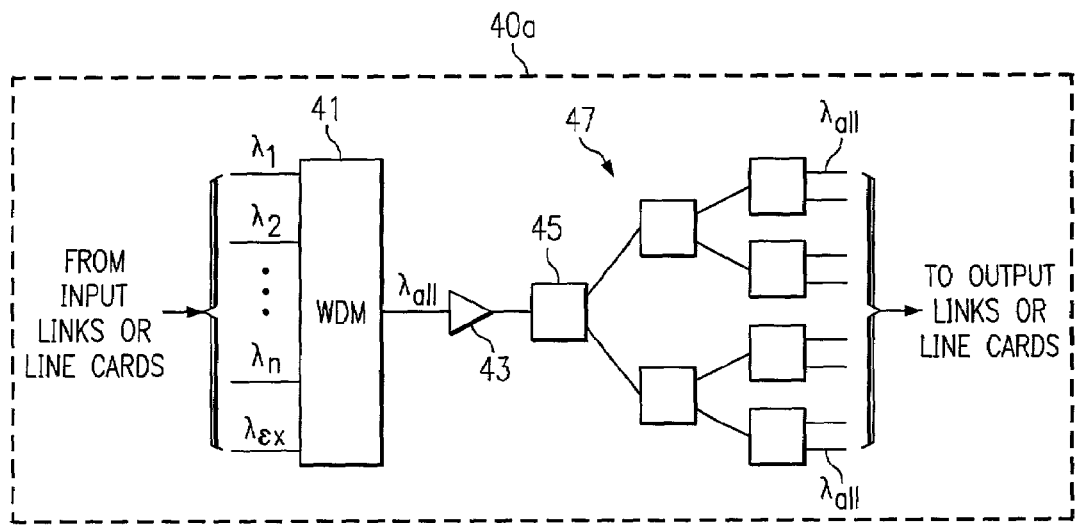
FIGS. 4a-4b are block diagrams illustrating example star switch fabric architectures.
Figure 4B:
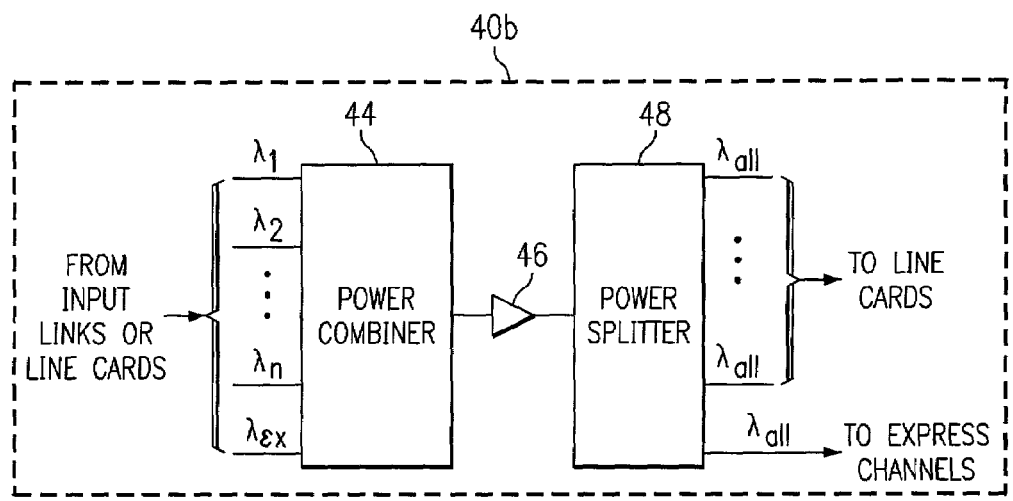

As discussed above, star switching fabric 40 can assume any of a variety of physical embodiments. For example, a plurality of fibers can be physically fused together to provide star switching capabilities. In addition, wave guide star couplers and arrayed wave guide gratings can be used to provide star switching functionality. FIGS. 4A-4B depict two particular embodiments of novel star switching architectures that can be implemented in any system using star switching functionality, including the optical routers described herein. In particular, FIG. 4A shows a wavelength-based star switching fabric 40a. Wavelength-based star switching fabric 40a includes a wavelength division multiplexer 41. Wavelength division multiplexer 41 receives a plurality of individual wavelength signals and combines those signals into a wavelength division multiplexed signal. Wavelength division multiplexer 41 may receive individual wavelength signals, for example, from line cards at input ports to a router, or may receive express lane traffic directly from input ports to the router.

Wavelength-based switching fabric 40a includes at least one optical amplifier 43 operable to receive and amplify the wavelength division multiplex signal generated by wavelength division multiplexer 41. Optical amplifier 43 could comprise any of a variety of amplifier types, such as a distributed Raman amplifier, a discrete Raman amplifier, a rare earth-doped amplifier, a semiconductor amplifier, or a combination of these or other types of amplifiers. Amplifier 43 can be selected, for example, to offset losses associated with distributing signals through star switching fabric 40 and/or to provide unity gain for bypass traffic traversing router 12.

Wavelength-based switching fabric 40a also includes a cascade of splitters 45. Cascade of splitters 45 is operable to receive the wavelength division multiplexed signal from amplifier 43 and to split that signal into a plurality of output signals. In a particular embodiment, each splitter in cascade 47 operates to approximately equally split each signal received into two output signals, each comprising substantially the same wavelength set output from wavelength division multiplexer 41. Multiple wavelength signals are then communicated from the outputs of cascade 47 to output links of the router or back to line cards for further processing.

In operation, wavelength-based star switching fabric 40a receives a plurality of signals each having a distinct center wavelength. Some of these signals can be the result of signals generated at line cards within a router, while others may be express traffic designated to pass through the router without electrical processing. Wavelength division multiplexer 41 combines some or all of these wavelengths into a multiple wavelength signal. The multiple wavelength output signal is amplified by amplifier 43 and communicated to a cascade 47 of splitters 45. Cascade 47 separates the incoming multiple wavelength signal into a plurality of output signals each carrying a substantially similar set of wavelengths as the input signal to the cascade.

FIG. 4B shows another embodiment of a star switching architecture, in this case a power-based star switching fabric 40b. Power-based star switching fabric 40b includes a power combiner 44 operable to receive a plurality of input signals. In this particular example, some or all of the input signals have center wavelengths distinct from other input signals. Power combiner 44 combines the input signals based on their power to create a combined signal carrying all information received at the inputs of power combiner 44. Power-based star switching fabric 40b also includes at least one optical amplifier 46 operable to receive the combined signal from power combiner 44, to amplify that signal, and to communicate the amplified signal to a power splitter 48. Amplifier 46 may be similar in structure and function to amplifier 43 described with respect to FIG. 4A. Power splitter 48 comprises a device, or combination of devices operable to separate the power combined signal into a plurality of output signals each containing substantially the same set of wavelengths output by power combiner 44. Signals output by power combiner 48 may be communicated directly to output links of a router, or may be communicated to line cards for additional processing.

To resolve contention between signals competing for the same system resources, it is helpful to implement a scheduling mechanism for use with star switching fabrics. Although complex scheduling mechanisms can be implemented without departing from the scope of the invention, the following figures address relatively simple scheduling mechanisms that can be implemented in conjunction with any star switching fabric, including those described herein. These scheduling mechanisms provide adequate contention resolution capabilities while utilizing minimum processing resources.

Figure 5A:
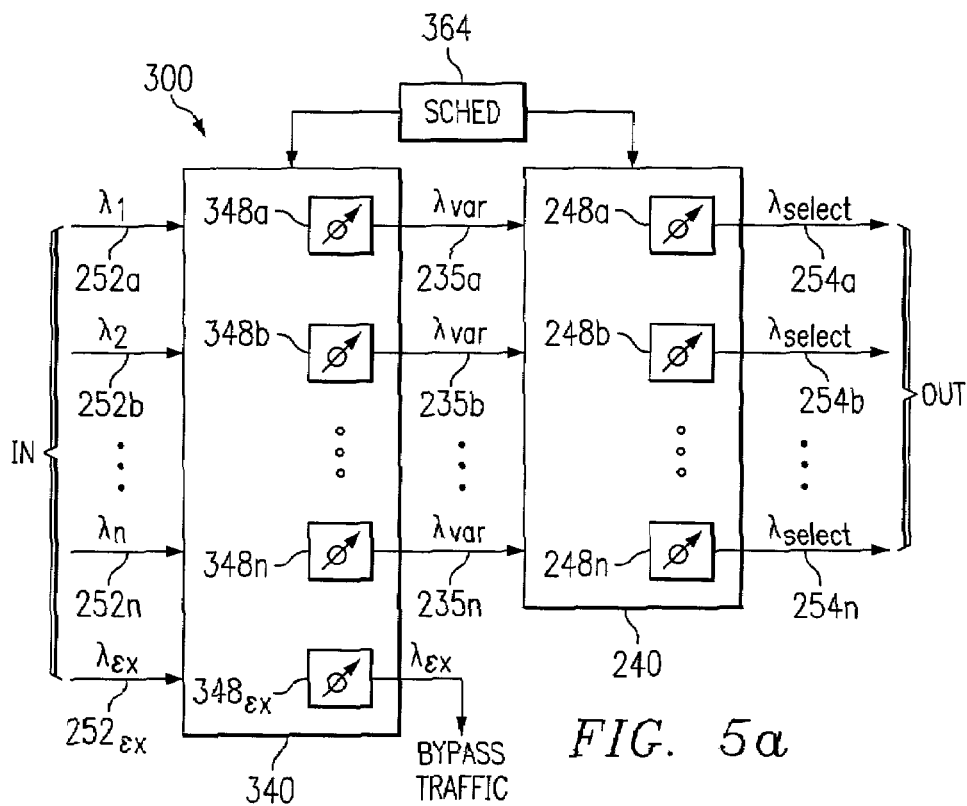
FIGS. 5a-5d are block diagrams illustrating example scheduling mechanisms for use with star switching fabrics, including those described herein.

FIG. 5a is a block diagram showing one example of a scheduling mechanism 300 useful in conjunction with any star switching fabric. This example depicts scheduling mechanism 300 operating within router 112 shown in FIG. 2. Scheduling mechanism 300 could, however, be useful with any router or switch using a star switching fabric. In this particular example, scheduling mechanism 300 includes a scheduling star switching fabric 340 configured to receive input signals 252. Signals received at inputs to scheduling star switching fabric 340 comprise a non-uniform load distribution, where some inputs receive more traffic than others. In a particular example, each input to scheduling star switching fabric 340 is associated with a particular wavelength and operates to receive traffic corresponding to the associated wavelength. In one particular example, each of the inputs to scheduling star switching fabric 340 may receive input optical router signals from an associated line card 230.

Scheduling star switching fabric 340 communicates signals 235 to a transmission star switching fabric 240. Transmission star switching fabric 240 communicates output router signals 254 toward line cards 230 and/or output links 228 from router 112. Scheduling star switching fabric 340 facilitates creating a more uniform load distribution of wavelength signals at the input to transmission star switching fabric 240 compared to the load distribution received at scheduling star switching fabric 340. Scheduling star switching fabric 340 helps to more evenly distribute the traffic load across the inputs to transmission switching fabric 340 to allow scheduling of communication through switching fabric 240 using a relatively trivial scheduling algorithm.

Scheduling mechanism 300 includes one or more scheduling engines 364. Scheduling engine 364 comprises any hardware, software, firmware, or combination thereof operable to instruct operation of tunable switching elements, such as tunable transmitters or tunable filters, within router 112. In this particular example, scheduling engine 364 communicates control signals to a plurality of tunable filters 348 in scheduling star switching fabric 340 and to a plurality of tunable filters 248 in transmission star switching fabric 240. Although this example illustrates a single scheduling engine communicating with filters 248 and filters 348, separate scheduling engines could be implemented.

Scheduling engine 364 executes a scheduling algorithm to determine the order in which filters 248 and 348 will be operated and the center wavelength to which each filter will tune. In this particular example, scheduling engine 364 executes a trivial control algorithm, such as a round robin algorithm. A round robin scheduling algorithm is simple to implement and requires minimal system resources for execution. Round robin scheduling algorithms exhibit good throughput for approximately uniform traffic patterns. A single stage round robin scheduling scheme used in combination with a star switching fabric can, however, experience a 1/N delay when confronted with N channels of non-uniform traffic.

One embodiment overcomes this difficulty by using one or more initial scheduling stages of scheduling star switching fabric to establish more uniform traffic at the inputs to a transmission star switching fabric 240. In particular, scheduling engine 364 instructs each of filters 348 to tune to alternating wavelengths so that no one of the outputs from scheduling star switching fabric 340 overwhelms transmission star switching fabric 240 with any particular wavelength signal. For example, on a first pass, each of filters 348a-348n may communicate in round robin fashion optical router signals 245 having wavelengths $\lambda_1$-$\lambda_n$, respectively. On a second pass, each of filters 348a-348n-1 may communicate in a round robin fashion optical router signals 245 having wavelengths $\lambda_2$-$\lambda_n$, respectively, while filter 348n communicates signal 245 having wavelength $\lambda_1$. Filters 348a-348n can continue to cycle through wavelengths $\lambda_1$-$\lambda_n$ so that the wavelength signals 245 are more uniformly distributed to the input of transmission star switching fabric 240. Although the illustrated embodiment depicts a single stage of scheduling star switching fabric, multiple scheduling star switching fabrics could be cascaded to further normalize the load distribution entering transmission switching fabric 240.

Establishing a more uniform traffic pattern at the input of transmission star switching fabric 240 allows the use of a round robin algorithm to control filters 248 associated with transmission star switching fabric 240 without the 1/N delay penalty. Thus, scheduling mechanism 300 provides a way to schedule non-uniform traffic, such as packet traffic, using a trivial scheduling algorithm for the transmission fabric, which occupies minimal system resources while avoiding 1/N delay penalties traditionally associated with simple routing algorithms and non-uniform traffic.

Numerous modifications can be made to the example discussed with respect to FIG. 5*a*. For instance, this example shows tunable filters 248 and 348 as residing in close proximity to or integrally to their respective switching fabrics 240 and 340. This provides an advantage of saving space, for example, on line cards in router 112. Moreover, this technique provides an advantage of facilitating the economical use of arrays of filters rather than individually packaged filters for each output link. Filters 248 and 348 could, however, reside remotely from switch fabrics 240 and 340.

Figure 5B:
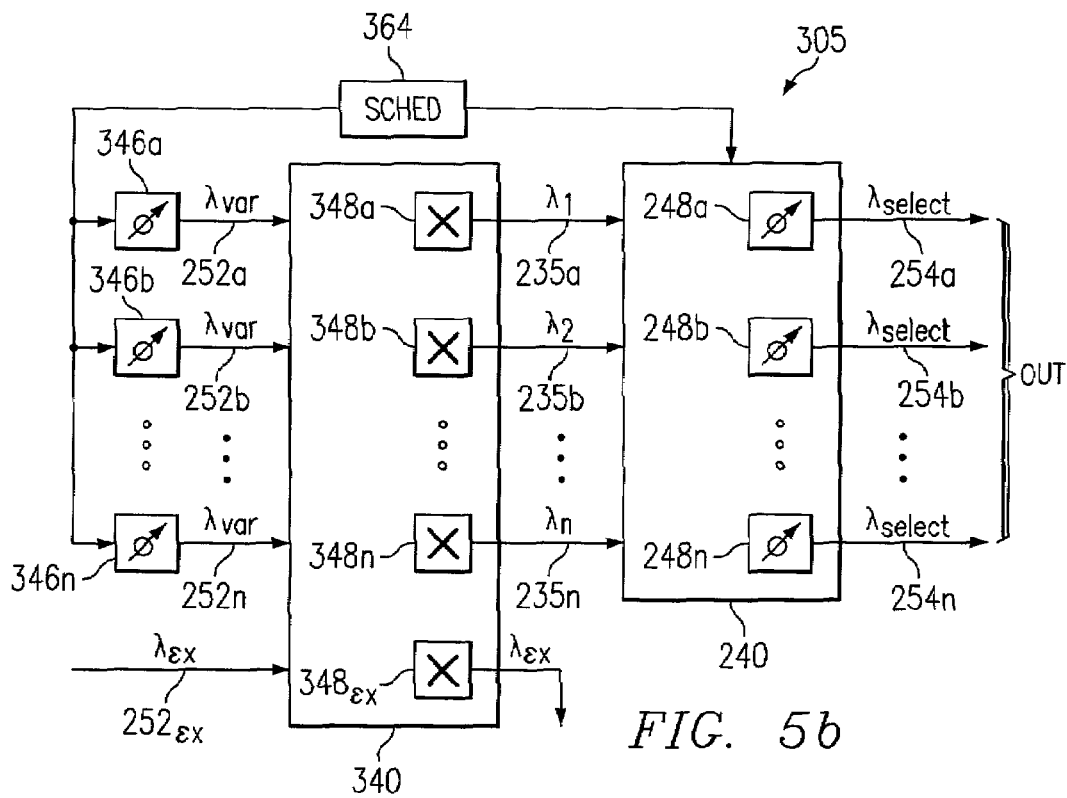

In addition, although this example shows the use of tunable filters 248 and 348, tunable optical transmitters could alternatively be used in conjunction with fixed wavelength or tunable wavelength filters 248 and/or 348. FIG. 5*b* is a block diagram illustrating an example embodiment of a scheduling mechanism 305 implementing tunable optical transmitters as selecting elements for the scheduling star switching fabric.

Scheduling mechanism 305 includes a plurality of tunable optical transmitters 346*a*-346*n*, which feed into scheduling star switching fabric 340. Each tunable optical transmitter could reside, for example, on a line card within router 112. Scheduling mechanism 305 also includes a plurality of filters 348*a*-348*n*. In this particular example, filters 348 comprise fixed wavelength filters, each associated with a particular center wavelength. Filters 348, in this example, reside within scheduling star switching fabric 340. Filters 348, however, could reside remotely from switching fabric 340.

In this embodiment, outputs of filters 348 are coupled to inputs of a transmission star switching fabric 240. Transmission star switching fabric 240 is associated, in this example, with a plurality of tunable filters 248*a*-248*n*, each associated with an output link 254*a*-254*n* from the router.

Scheduling mechanism 305 further includes one or more scheduling engines 364. Scheduling engine 364 instructs selecting elements 346 and 248 as to the order of tuning and the center wavelength appropriate for tuning. Although a single scheduling engine 364 is depicted, separate engines could be implemented for elements 346 and 248.

In operation, tunable optical transmitters 346*a*-346*n* generate optical signals 252*a*-252*n* having center wavelengths determined by scheduling engine 364. Scheduling star switching fabric receives signals 252*a*-252*n* and communicates substantially similar sets of at least some of those signals to each of filters 348. In this example, each filter comprises a fixed wavelength filter operable to pass signals having a particular center wavelength.

Signals 235 passed by filters 348 are then communicated to transmission star switching fabric 240. tunable filters 248 of transmission star switching fabric 240 tune to receive selected wavelengths according to instructions from scheduler 364. As a result, selected wavelength signals are passed from transmission star switching fabric 240 to output links 254.

Figure 5C:
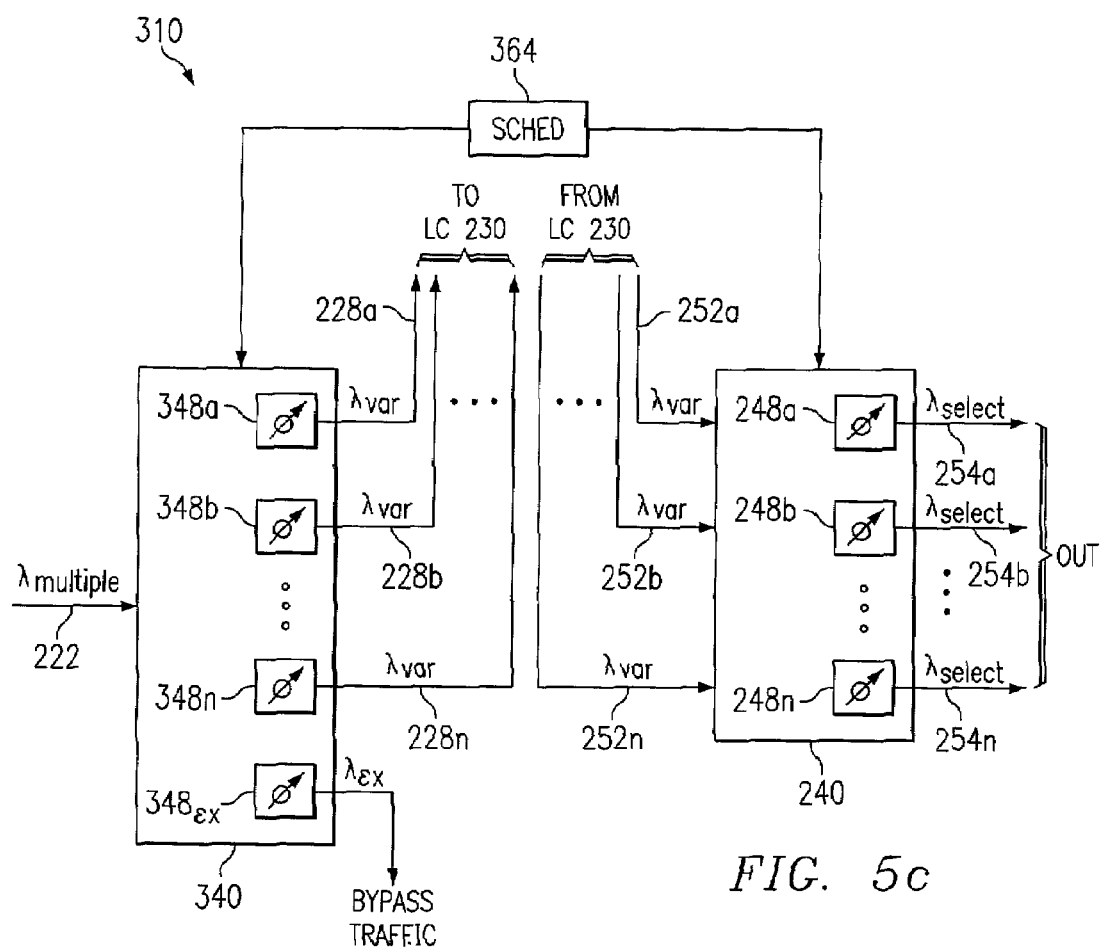

FIG. 5*c* is a block diagram illustrating another example of a scheduling mechanism 310 useful in conjunction with any star switching fabric. Like the example shown in FIG. 5*a*, this example depicts scheduling mechanism 310 operating within router 112 shown in FIG. 2. Scheduling mechanism 310 could, however, be useful with any router or switch using a star switching fabric. Scheduling mechanism 310 is similar in structure and function to scheduling mechanism 310 shown in FIG. 5*a*.

Scheduling mechanism 310 implements a buffering stage 230 between scheduling star switching fabric 340 and transmission star switching fabric 240. Buffering stage 230 facilitates synchronization and aids in scheduling communications between scheduling star switching fabric 340 and transmission star switching fabric 240. As a particular example, buffering stage 230 could comprise a plurality of line cards, each associated with an input to transmission star switching fabric 240. Buffering stage 230 may also include memory used to avoid missequencing of packets received by and communicated from scheduling star switching fabric 340.

In this example, scheduling switching fabric 340 receives the multiple wavelength signal from input link 222 and communicates separate wavelength signals 228*a*-228*n* (along with any express traffic 228*ex*) from switching fabric 340. In the illustrated embodiment, wavelength signals 228*a*-228*n* are communicated to line cards 230 for buffering and/or electronic decision making with respect to routing those signals through switching fabric 240. Transmission star switching fabric 240 receives input router signals 252*a*-252*n* and communicates those signals toward destination elements associated with those signals.

Scheduling switching fabric 340 operates to separate the multiple wavelength signal received at input 222 into a plurality of wavelength signals each having a center wavelength. In this particular example, Scheduling switching fabric 340 includes or is closely coupled to a plurality of tunable filters 348*a*-348*n*, and 348*ex*. Tunable filters 348 selectively pass wavelength signals 228*a*-228*n* toward transmission star switching fabric 240. In this particular embodiment, scheduling star switching fabric 340 passes selected signals 228 to line cards 230 for processing.

Like the example in FIG. 5*a*, scheduling engine 364 operates to provision tunable filters 348*a*-348*n* in a round-robin fashion so that each filter 348 alternates the wavelength it passes toward transmission star switching fabric 240. In this manner, scheduling switching fabric 340 operates to make non-uniform traffic received at input 222 more uniform at the inputs to transmission star switching fabric 240. Because the incoming signals 252*a*-252*n* to switching fabric 240 are more uniform in load distribution, scheduling mechanism 310*a* can ensure reasonable throughput through switching fabric 240 while utilizing a relatively simple scheduling algorithm, such a round-robin scheduling algorithm.

The particular embodiment shown in FIG. 5*c* is just one example of an implementation of scheduling mechanism 310 in an optical router. Various modifications can be made without departing from the scope of this aspect of the invention. For example, rather than using tunable filters in both switching fabrics 240 and 340, tunable lasers could be implemented in conjunction with fixed or tunable filters to achieve similar operational effects. For example, line cards 230 could include tunable lasers operable to selectively communicate optical router signals 252a-252n at selected wavelengths to fixed wavelength transmitters 248a-248n associated with particular output links from router 112.

Moreover, although this example shows filters 248 and 348 as residing integrally to or in close proximity with switching fabrics 240 and 340, respectively, filters 248 and/or 348 could alternatively reside remotely from their associated switching fabrics. In one particular example, filters 248 and/or 348 could reside on line cards associated with those filters, or in another location remote from their associated switching fabrics.

As another example of a potential modification to the embodiment shown in FIG. 5c, processing capabilities and look-up tables of line cards 230 could be eliminated, while electronic or optical memory structures resident on the line cards could remain. These memory structures could serve as buffers to optical signals received from scheduling switching fabric 340 and awaiting transmission to transmission switching fabric 240. These buffers could further enhance the uniformity of wavelengths communicated to star switching fabric 240.

Figure 5D:
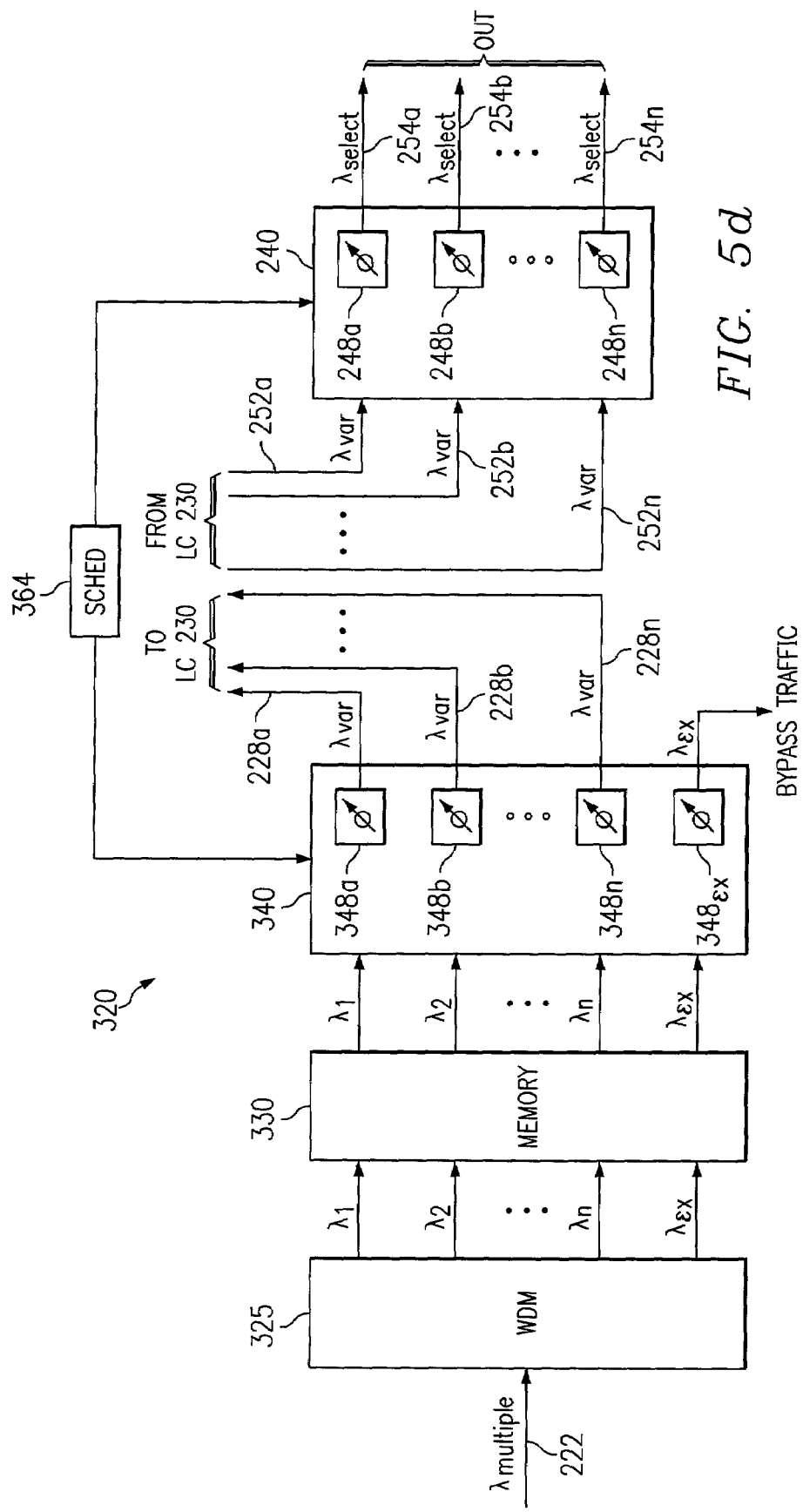

FIG. 5d is a block diagram showing yet another example of a scheduling mechanism 320 useful in conjunction with any star switching fabric. Like the example shown in FIGS. 5a-5c, this example depicts a scheduling mechanism 320 operating within router 112 shown in FIG. 2. Scheduling mechanism 320 could, however, be useful with any router or switch using a star switching fabric.

Scheduling mechanism 320 is similar in structure and function to scheduling mechanism 320 shown in FIG. 5c. Scheduling mechanism 320, however, implements an input buffer stage 330 operable to receive wavelength signals from a wavelength division multiplexer 325 and an output buffer stage 332 operable to operable to receive wavelength signals 254 output from transmission star switching fabric 240.

Input buffer stage 330 facilitates segmentation, synchronization, buffering, and/or scheduling of communications to scheduling star switching fabric 340. Input buffer stage 330 could comprise any hardware, software, firmware, or combination thereof operable to facilitate storage and retrieval of signals received. In some embodiments, input buffer stage 330 could comprise an optical memory comprising, for example, one or more delay loops. In other embodiments, input buffer stage could comprise an electronic memory. Input buffer stage 325 could reside, for example on one or more line cards operable to convert at least a portion of incoming optical signals to an electronic format and to generate optical signals for retransmission to scheduling switching fabric 340. In one particular embodiment, input buffer stage 325 could reside on line cards 230.

Input buffer stage 325 can facilitate creating an even more uniform load distribution of wavelength signals at the input to star switching fabric 240. Moreover, input buffer stage 325 can provide a mechanism to help alleviate missequencing of packets at the outputs from star switching fabric 240. This technique can be particularly effective when used in combination with a Full Frames First algorithm to control the buffers in the system.

In operation, scheduling mechanism 320 receives at wavelength division multiplexer 325 a multiple wavelength input signal from input link 222. Wavelength division multiplexer 325 separates the multiple wavelength input signal into a plurality of optical signals, each having a center wavelength. Input buffer stage 325 stores incoming wavelength signals until those signals are communicated toward scheduling switching fabric 340. Switching fabric 340 communicates substantially similar sets of some or all of the wavelength signals received to filters 348.

In this example, filters 348 comprise tunable filters residing in close proximity to or integrally with switching fabric 340. Scheduling engine 364 instructs each of filters 348a-348n in a round robin fashion to alternately communicate signals having various selected wavelengths. This reduces the nonuniformity of wavelengths of incoming signals.

Transmission star switching fabric 240 receives input router signals 252 having a more uniform load distribution, and communicates substantially similar sets of some or all of the wavelength signals received to filters 248. Each of filters 248 is provisioned in a round robin fashion to pass selected wavelength signals toward output links associated with appropriate destination elements.

As in the examples described in FIGS. 5a-5c, the example shown in FIG. 5d could be modified in any number of ways. For example, tunable optical transmitters could be used in place of some or all of the tunable filters implemented. Moreover, filters 248 and 348 could reside remotely from their associated switching fabrics.

Each of the embodiments of scheduling mechanisms depicted in FIGS. 5a-5d provides a way to provide adequate throughput through switching fabric 240 while utilizing a relatively simple scheduling algorithm.

Figure 6A:
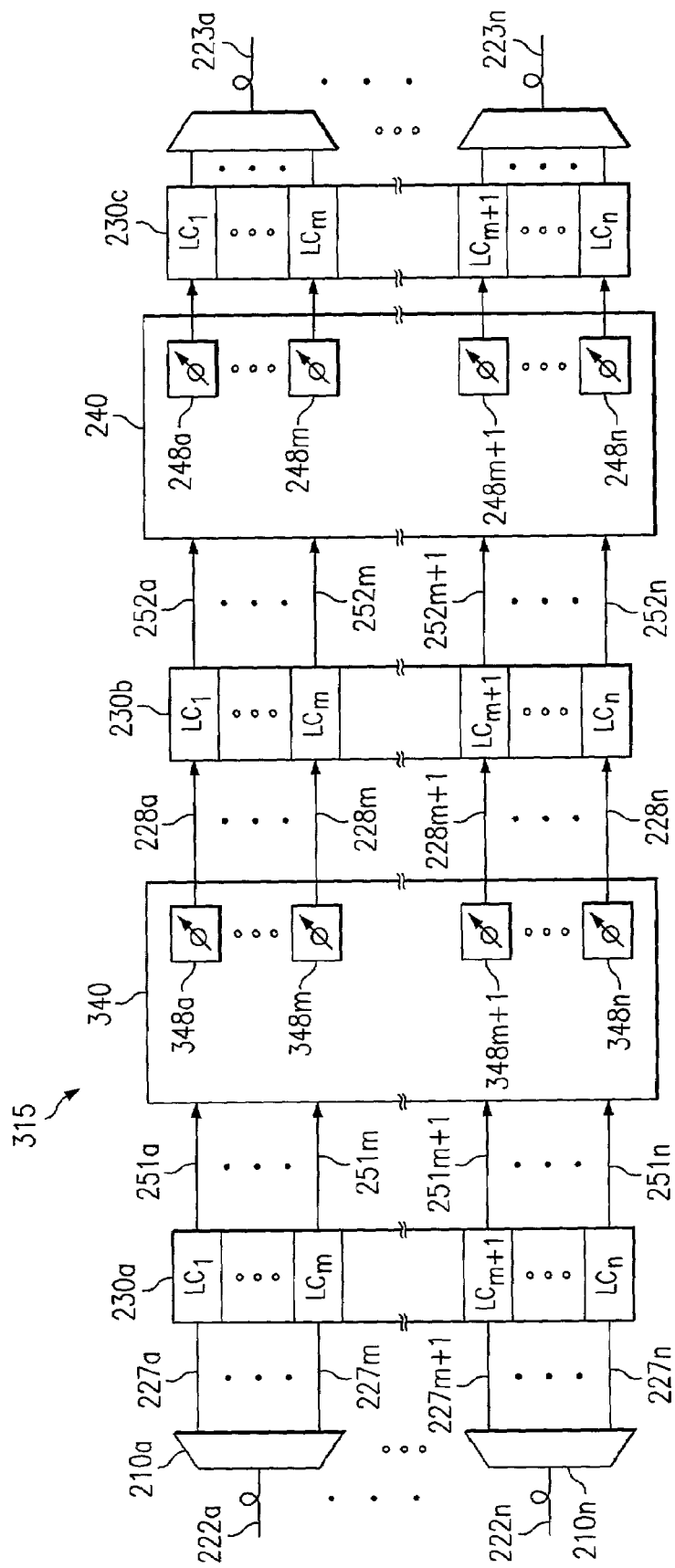
FIGS. 6a-6d are block diagrams illustrating additional example scheduling mechanisms for use with star switching fabrics, including those described herein.

FIGS. 6a-6d provide additional nonlimiting examples of implementations of scheduling mechanisms useful with star switching fabrics. FIG. 6a is a block diagram showing an example of a multiple buffer embodiment 315 utilizing tunable optical filters as selecting elements within a scheduling star switching fabric. In particular, embodiment 315 includes a plurality of line cards 230 which serve as an input buffer stage 230a, an intermediate buffer stage 230b, and an output buffer stage 230c. Although this embodiment depicts the use of different sets of cards 230a-230c to serve as input, intermediate, and output buffer stages, the same set of line cards could likewise be used for some or all of the buffer stages, or one or more buffer stages could be eliminated.

In this example, input buffer stage 230a operates to segment incoming information into, for example, fixed length frames or cells for transmission through transmission switching fabric 240. Input buffer stage 230a can also perform a temporary storage function while packets are scheduled for transmission through scheduling star switching fabric 340.

In the illustrated embodiment, scheduling star switching fabric 340 comprises or is coupled to a plurality of tunable optical filters 348a-348n, each associated with an output from scheduling star switching fabric 340. Under the control of a scheduling engine 364 (located, for example, on one or more line cards 230), tunable filters 348a-348n tune, in a round robin fashion, to particular wavelengths to be transmitted toward the inputs of transmission star switching fabric 240. Scheduling engine 364 instructs each filter 348 to alternate the wavelength of information communicated so that the inputs to transmission star switching fabric 240 experience a more uniform traffic load than the inputs to scheduling star switching fabric 340.

In this example, optical transmitters associated with each line card 230b generate input optical router signals 252 at particular wavelengths associated with each line card 230b. Signals 252 are communicated to transmission star switching fabric 240, where substantially similar sets of at least some of input optical router signals 252 are communicated to each of a plurality of tunable filters 248a-248m, each associated with an output link from the device. Processors on or associated with line cards 230b perform electronic decision making on signals 228 received to determine an appropriate path for each signal from transmission star switching fabric 240. Based on this determination, the processors instruct tunable filters 248 to tune to particular wavelengths so that signals destined for the output link associated with that tunable filter 248 are passed by that filter.

Because scheduling star switching fabric 340 has created a more uniform traffic distribution at the inputs of transmission star switching fabric 240, the scheduling engine that schedules communication through transmission star switching fabric 240 can implement a trivial scheduling algorithm, such as a round robin algorithm, to effectively administer system resources.

Figure 6B:
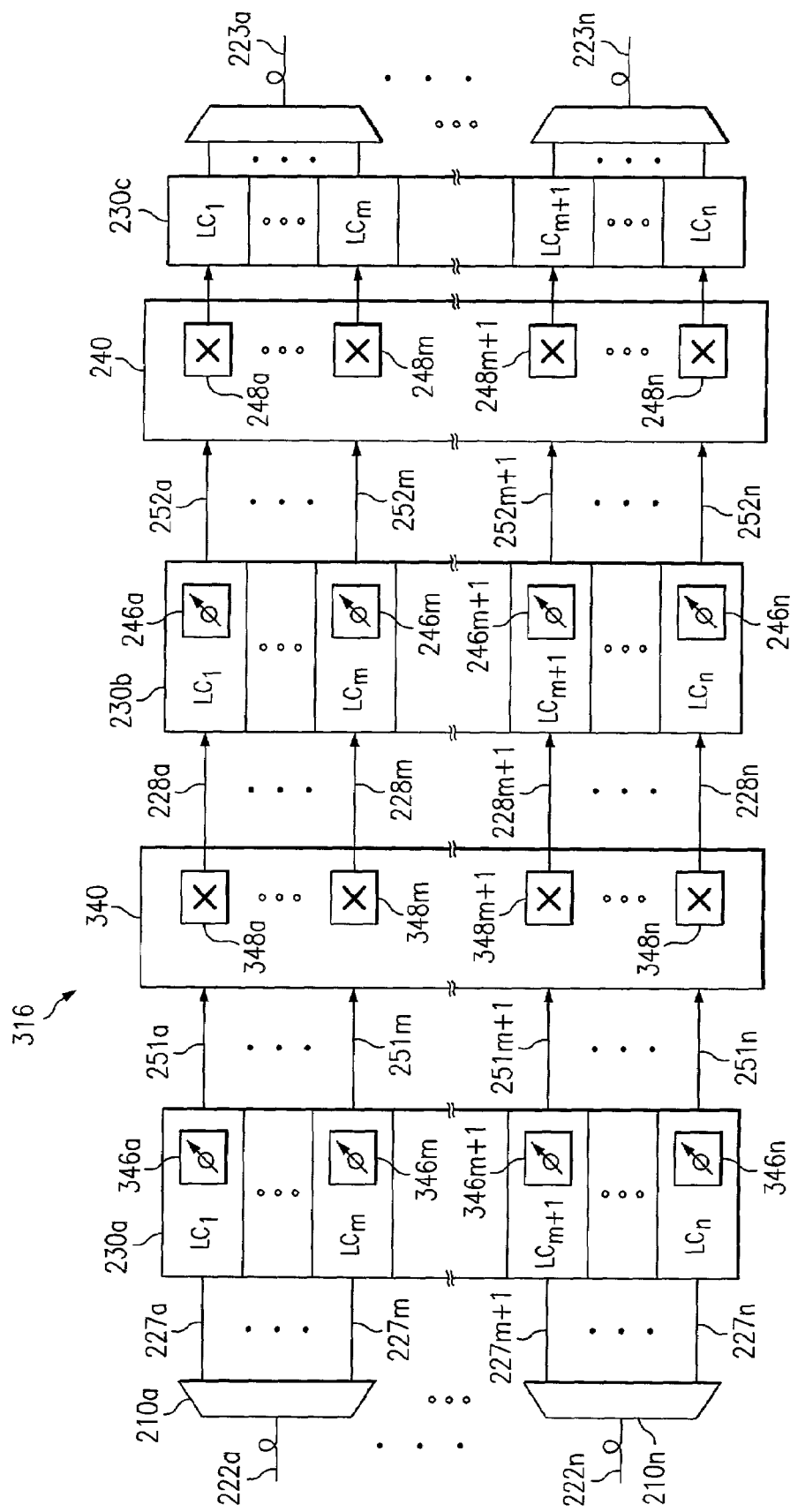

FIG. 6b is a block diagram of an example multiple buffer embodiment 316 utilizing tunable optical transmitters 346 as selecting elements within a scheduling star switching fabric 340.

Embodiment 316 includes a plurality of line cards 230 which serve as an input buffer stage 230a, an intermediate buffer stage 230b, and an output buffer stage 230c. Buffer stages 230a-230c can serve similar functions to like stages described above with respect to FIG. 6a. Although this embodiment depicts the use of different sets of cards 230a-230c to serve as input, intermediate, and output buffer stages, the same set of line cards could likewise be used for some or all of the buffer stages, or one or more buffer stages could be eliminated.

In the illustrated embodiment, scheduling star switching fabric 340 comprises or is coupled to a plurality of tunable optical transmitters 346a-346n, each associated with an input to scheduling star switching fabric 340. Under the control of a scheduling engine 364 (located, for example, on one or more line cards 230), tunable transmitters 346a-346n tune, in a round robin fashion, to particular wavelengths to be transmitted toward the inputs of scheduling star switching fabric 340. Scheduling engine 364 instructs each transmitter 346 to alternate the wavelength of information communicated so that the inputs to transmission star switching fabric 240 (received from outputs of scheduling star switching fabric 340) experience a more uniform traffic load than the inputs to scheduling star switching fabric 340.

Scheduling star switching fabric 340 receives the plurality of incoming signals and communicates substantially similar sets of at least some of the signals received to each of a plurality of fixed wavelength filters 348a-348n. Each filter 348 is tuned to a particular wavelength and communicates signals 228 having the associated wavelength to an associated one of line cards 230.

Processors on or associated with line cards 230b perform electronic decision making on signals 228 received to determine an appropriate path for each signal from transmission star switching fabric 240. In this example, each line card 230 includes or is associated with a tunable optical transmitter 246a-246n, respectively. Tunable optical transmitters 246 tune to selected wavelengths under the direction of scheduling engine 364 executed by the processors. Scheduling engine 364 instructs each tunable transmitter 246 to tune, in a round robin fashion, to a particular wavelength. Signals are communicated from tunable transmitters 246 to transmission star switching fabric 240, which communicates a substantially similar set of at least some of the signals received toward each of a plurality of fixed wavelength filters 248 within or coupled to transmission star switching fabric 240. The wavelength selected for each transmitter will determine the output link over which the generated signal will pass, as each of the fixed wavelength filters 248 passes a wavelength associated with a particular output link associated with that filter.

Because scheduling star switching fabric 340 has created a more uniform traffic distribution at the inputs of transmission star switching fabric 240, the scheduling engine that schedules communication through transmission star switching fabric 240 can implement a trivial scheduling algorithm, such as a round robin algorithm, to effectively administer system resources.

Figure 6C:
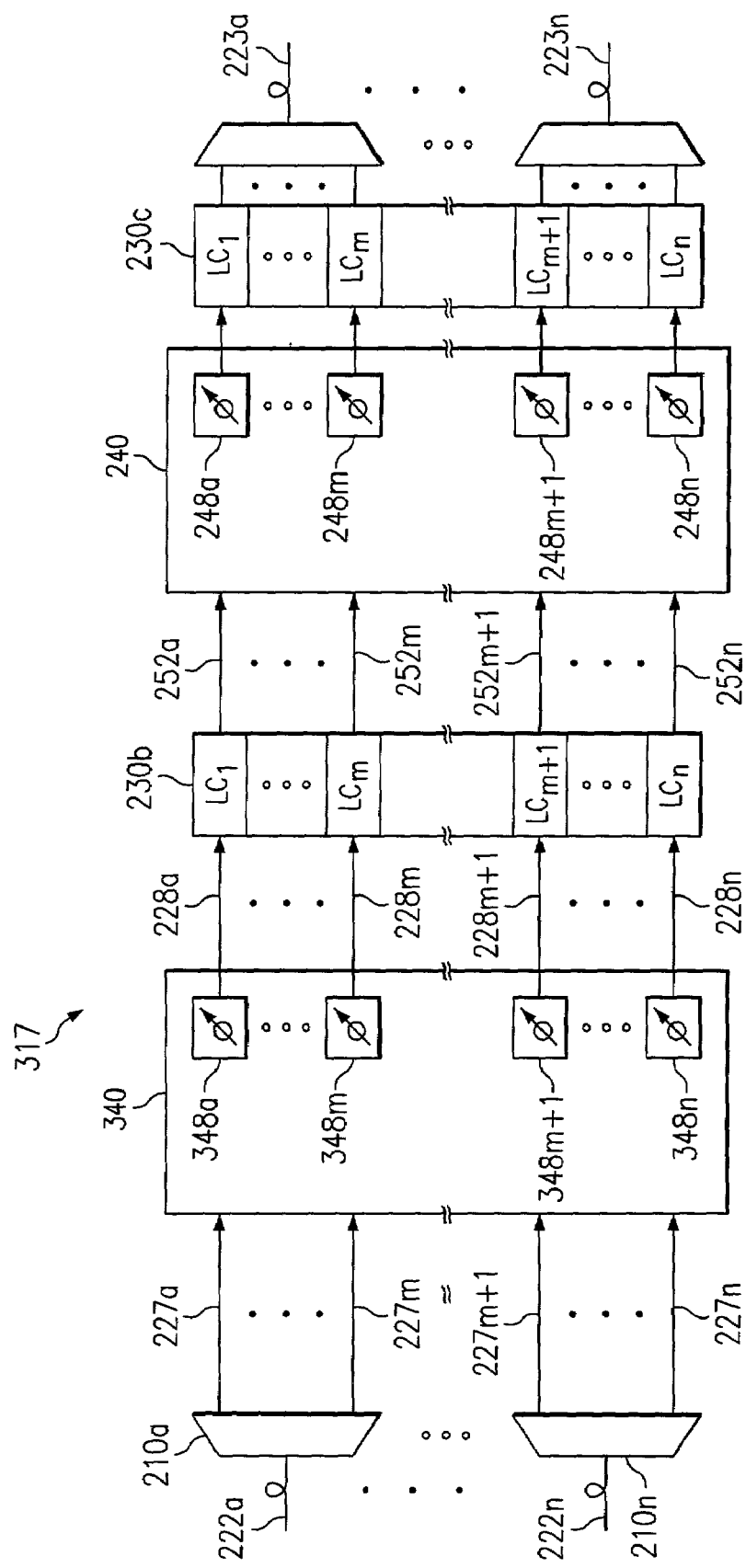

FIG. 6c is a block diagram showing yet another embodiment 317 of a multiple buffer stage switching fabric using tunable optical filters as selecting elements.

This embodiment is similar in structure and function to the embodiment depicted in FIG. 6a, but introduces input signals directly to scheduling star switching fabric 340 without an input buffer stage preceding scheduling star switching fabric 340.

Figure 6D:
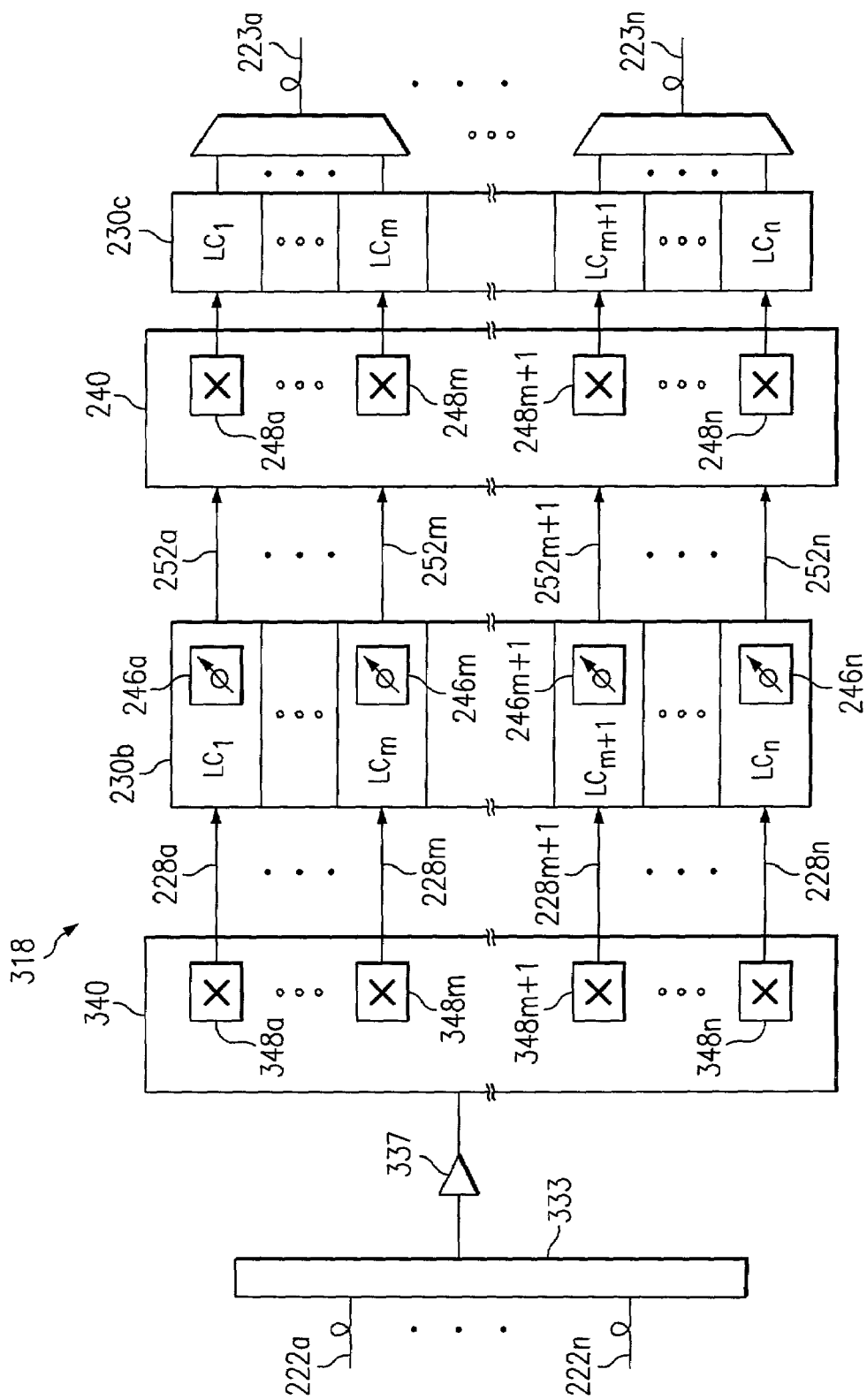

FIG. 6d is a block diagram showing yet another embodiment 318 of a multiple buffer stage switching fabric using tunable optical filters as selecting elements.

This embodiment is similar in structure and function to the embodiment depicted in FIG. 6c, but implements a power combiner 333 in place of wavelength division multiplexers 210 shown in FIGS. 6a-6c. In addition, this embodiment can use one or more optical amplifiers 337 prior to the input to scheduling star coupler 340. Optical amplifiers 337 operate to compensate for at least a portion of the loss otherwise caused by power combiner 333.

As discussed above, various embodiments of devices implementing star switching fabrics implement optical transmitters to generate signals destined for the star switching fabric. Some embodiments described herein have discussed implementing optical transmitters having fixed or tunable wavelength capabilities on line cards within the devices. As the number of channels serviced by the system increases, difficulties can arise with respect to implementation of conventional optical transmitter technology.

For example, implementing a conventional laser diode on each line card servicing a transmission channel can be prohibitively expensive as the number of channels become large. Moreover, conventional lasers and associated control circuitry can take up significant space on each line card, leaving less space for other processing elements, or requiring larger line cards. Requiring larger line cards typically reduces the number of cards that can be placed in any given rack.

In addition, as the number of channels increases, it becomes increasingly difficult to administrate accurate assembly of line cards using fixed wavelength transmitters. In that case, it becomes necessary to ensure that each line card receives a transmitter operating at a wavelength specified for that card. Increased numbers of channels make it difficult to accurately associate transmitter part numbers with particular line cards.

Furthermore, as the number of channels increases, the channel spacing typically becomes more narrow. It becomes increasingly difficult to stabilize the wavelength of each individual transmitter to ensure proper channel spacing.

Figure 7:
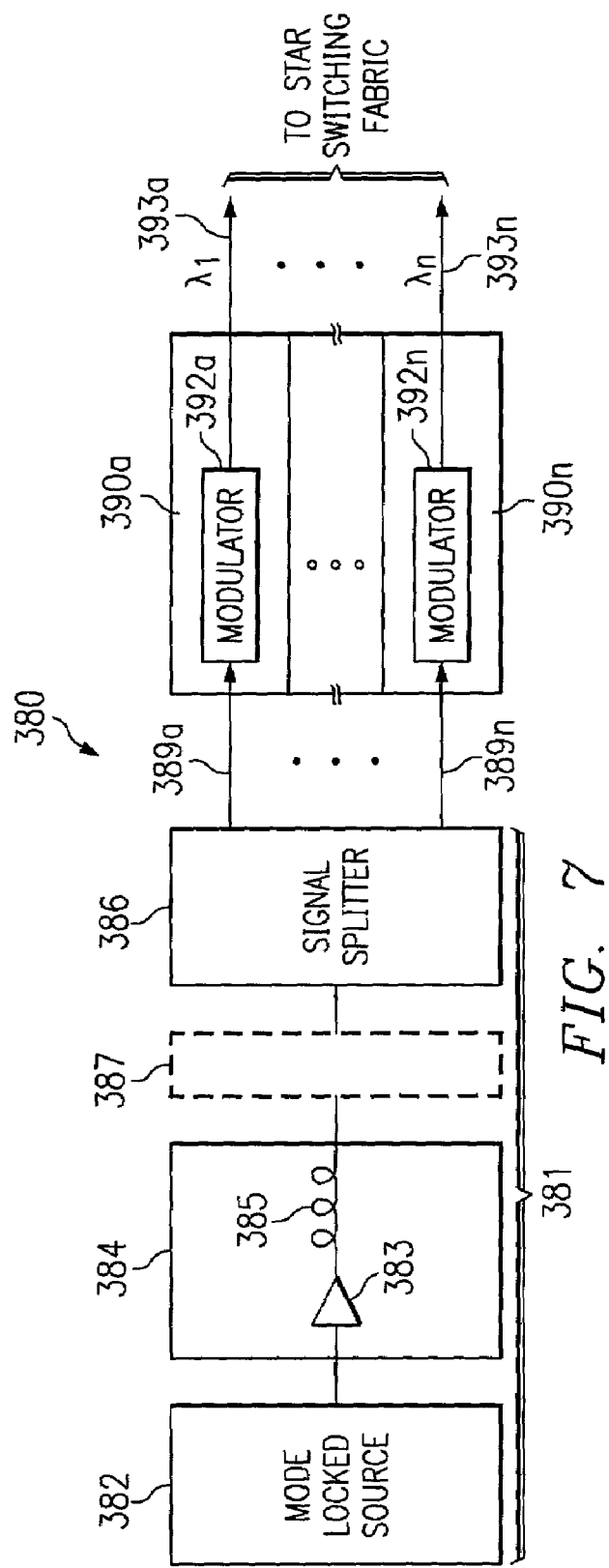
FIG. 7 is a block diagram illustrating an example embodiment of a continuum optical source for use with a star switching fabric, including those described herein.

FIG. 7 is a block diagram of an optical transmitter system 380 particularly useful, for example, in conjunction with a star switching fabric implementing large number of channels, for instance 64 or more channels. Optical transmitter system 380 comprises a continuum source. In a particular embodiment, system 380 could comprise a supercontinuum source. Supercontinuum generation describes extreme, nearly continuous spectral broadening induced by high-intensity picosecond and sub-picosecond pulse propagation through a nonlinear medium.

In this example, system 380 includes a modelocked source 382 operable to generate a series of optical pulses. As a particular example, modelocked source 382 could comprise an erbium doped fiber laser operable to generate pulses at a rate of, for example, forty gigabits per second. Other modelocked sources operating at other rates could likewise be used.

System 380 further includes a continuum generator 384 operable to receive a train of pulses from modelocked source 382 and to spectrally broaden the pulses to form an approximate spectral continuum of optical signals. In this example, continuum generator 384 includes an optical amplifier 383 coupled to one or more lengths of optical fiber 385. Optical amplifier 383, in this particular example, comprises an erbium doped amplifier. Other amplifier types or combinations of amplifier types could likewise be used. In this example, fiber 385 comprises a two stage solution-effect compressor including approximately two meters of standard fiber followed by approximately two meters of dispersion shifted fiber. Other lengths of fiber and fiber types could be used, depending on the spectral characteristics desired. Moreover, although this example relies on the solution effect to broaden the spectrum of the plurality of optical pulses, other pulse compression techniques, such as adiabatic solution compression, could alternatively be used.

System 380 also includes a signal splitter 386. Signal splitter 386 receives the continuum from continuum generator 384 and separates the continuum into individual signals 389a-389n each having a wavelength or a range of wavelengths. Signal splitter 386 could comprise, for example, a passive wavelength division multiplexer, a power splitter followed by fixed wavelength filters, or any other mechanism operable to separate a continuum or near continuum of signals into a plurality of individual signals.

Mode locked source 382, continuum generator 384, and signal splitter 386 can comprise common bay equipment—in other words, equipment shared by plurality of line cards 390. Where it is desired to generate a larger bandwidth of optical signals, multiple sets of common bay equipment 381 can be implemented, each set serving a separate set of line cards 390 and each generating a separate range of wavelengths.

Signal splitter 386 communicates signals 389a-389n to one of a plurality of modulators 392a-392n, respectively. Modulators 392 operate to encode information onto the optical signals received to produce optical wavelength signals 393 for transmission to a star switching fabric. In this particular example, each modulator 392 resides on a line card 390. When used with a continuum source, each of the plurality of transmitters in system 380 can be viewed as one of modulators 392 in combination with equipment, such as common bay equipment 381, used to generate the unmodulated signal received by each modulator 392.

In some embodiments, system 380 further comprises a pulse rate multiplexer 387, such as a time division multiplexer. Pulse rate multiplexer 387 operates to multiplex pulses received from mode locked source 382 to increase the bit rate of the system. Pulse rate multiplexer 387 could alternatively reside downstream from modulators 392 and operate to time division multiplex signals received from modulators 392.

In operation, modelocked source 382 generates a plurality of optical pulses at a given rate. Continuum generator 384 receives the train of pulses from modelocked source 382 and compresses those pulses to form an approximate continuum of optical signals. Signal splitter 386 receives and separates the continuum into a plurality of optical signals 389a-389n each comprising a wavelength or range of wavelengths. Each modulator 392 receives one of signals 392 from signal separator 386 and encodes information onto the optical signal received to generate signals 393 for transmission to a star switching fabric.

Transmitter system 380 can support generation of fixed wavelength signals or selectively tuned wavelength signals. To facilitate generation of selectively tuned wavelength signals, system 380 could include, for example, a signal selector 395 operable to selectively pass particular wavelength signals to particular modulators 393, depending on the wavelength signal desired to be transmitted from that modulator 393. Signal selector 395 could comprise any hardware, software, firmware, or combination thereof operable to send particular wavelength signals to particular modulators in response to, for example, a control signal generated by a scheduling engine.

System 380 provides numerous benefits over systems implementing separate optical transmitters for each channel. For example, implementing one or more common modelocked sources to generate numerous wavelength signals, saves considerable space on each line card, and reduces cost by eliminating numerous individual transmitters. Moreover, system 380 facilitates using common parts, such as modulators, for a number of different line cards serving different channels. This makes it easier to match parts to each line card. Furthermore, stabilization issues can be alleviated because system 380 allows stabilization of one or a few common transmitter elements, rather than requiring stabilization of separate transmitters each associated with one of the channels.

FIGS. 8-9 are block diagrams illustrating example mechanisms useful enhancing the effective switching speed of devices using star switching fabrics. For the purposes of illustration, these mechanisms will be described with reference to router 112 shown in FIG. 2. These mechanisms could, however, equally apply to many other device designs implementing star switching fabrics.

Figure 8A:
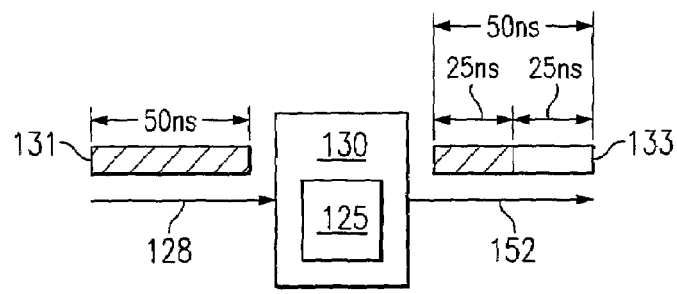
FIGS. 8a-8b are block diagrams illustrating example mechanisms useful in increasing the speed of optical routers including those described herein.

FIG. 8a illustrates the use of a speed-up mechanism 125 at line card 130. In this example, line card 130 receives incoming optical signal 128, which includes packets having a first duration, say fifty nanoseconds each. Each optical packet 128 is converted to an electronic signal within line card 130 and then placed into an optical format 152 for transmission to the router switching fabric.

Speed-up mechanism 125 of line card 130 operates to decrease the duration of each optical packet 128. For example, speed-up mechanism 150 may increase the speed at which a modulator of line card 130 encodes information onto optical signal 152. As a particular example, information can be modulated onto optical signal 152 at an increased rate resulting in the information received in optical signal 128 being modulated in an optical signal 152 having one half the duration of signal 128. Other speed-up ratios could be used without departing from the scope of the invention.

Figure 8B:
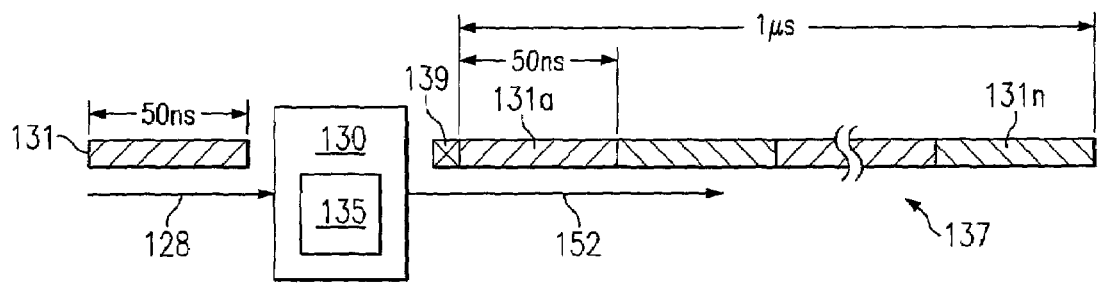

FIG. 8b is a block diagram showing one example of an aggregator 135 operable to aggregate a plurality of incoming packets 131 into a single aggregated frame 137. Each aggregated frame includes an identifier identifying a destination element common to each packet 131 in the aggregated frame 137. Aggregator 135 can aggregate multiple packets 131, for example, by encapsulating a plurality of packets within a single aggregation frame having a common aggregation header.

Aggregator 135 can assemble aggregated frames 137 in a variety of ways. For example, aggregator 135 can aggregate optical packets received at line card 130 from input link 128, associating an identifier with each frame 137. Line card 130 can then convert at least the identifier portion of the frame 137 to an electronic format to facilitate electronic processing of that information. Line card 130 could then generate an optical aggregation header and reform an aggregated frame for transmission to star switching fabric 140. As another example, aggregator 135 could form aggregated frames 137 after each packet 131 of that frame or portions thereof are processed by processor 136. In that case, processor 136 converts all or a portion of each packet received to an electrical signal to facilitate electronic processing. Transmitter 146 forms optical router packets, and aggregator 135 combines optical router packets into aggregated frames 137.

Allowing switching fabric 140 to switch a smaller number of larger frames rather than numerous individual packets can provide significant switching efficiencies.

Figure 9A:
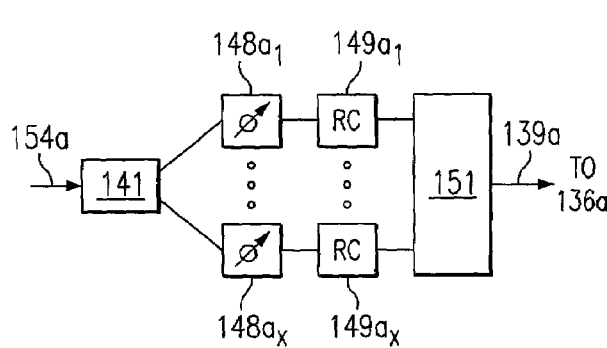
FIGS. 9a-9c are block diagrams illustrating additional example mechanisms useful in increasing the speed of optical routers including those described herein.
Figure 9B:
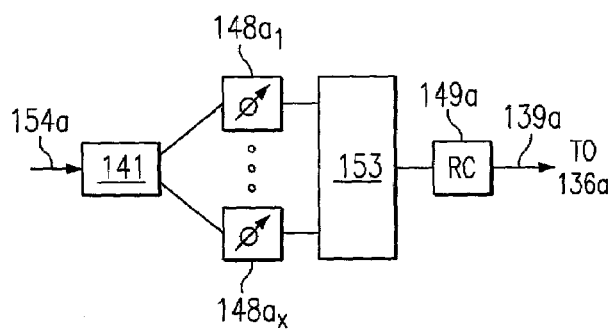
Figure 9C:
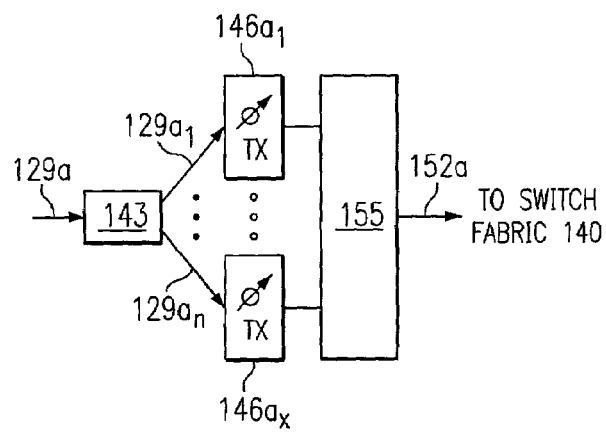

FIGS. 9a-9c are block diagrams showing various embodiments of filter and transmitter configurations operable to enhance the effective switching speed of router 12 without modifying the switching speed of any individual components, such as filters 148 or transmitters 146. In particular, FIG. 9a is a block diagram of a multiple filter configuration. The speed of router 112 can be limited in some cases by the switching speed of filters 148. That is, each filter requires some finite time to tune between different wavelengths desired to be processed. If router 112 is forced to wait while filters 148 reset between wavelengths, the speed of router 112 can be significantly hindered.

The example embodiment in FIG. 9a helps to alleviate this problem without requiring increased switching speed of any one filter 148, by assigning a plurality of filters 148a1-148ax to each optical link 128. Filters 148a1-148ax operate in parallel so that while one filter 148a1 is processing output optical router signal 154 from switch fabric 140, other filters 148a2-148ax can be retuned to another wavelength to receive packets carried over other channels. By switching between the multiple parallel filters 148a1-148ax, switching delay that might otherwise be caused when waiting for filters 148 to retune can be significantly reduced.

In the illustrated embodiment, an optical splitter 141 receives output optical router signal 154 from switch fabric 140 and communicates a portion 154a1-154ax to each of filters 148a1-148ax, respectively. In this particular example, a switch 151 cycles between signals received from filters 148a1-148ax so that only one of the signals from filters 148a is output to line card 136. Although this example shows use of a sequential control algorithm that switches from one filter output to another, a variety of control algorithms can be used to determine an active filter 148a. For example, switch 151 could receive a control signal instructing switch 151 as to which filter output to accept.

In the embodiment shown in FIG. 9a, optical signals output from filters 148a are converted to electrical signals at receivers 149a, each associated with one of filters 148a. Switch 151 operates to process electrical signals received from converters 149a and to pass an electrical output to an associated line card 136. The embodiment shown in FIG. 9b is similar in structure and function to that shown in FIG. 9a, except that electrical switch 151 is replaced with an optical switch 153. Optical switch operates to receive optical signals from filters 148a and to select one of those optical signals for communication to converter 149a. Converter 149a converts the selected signal to an electrical signal and passes the converted electrical signal to an associated line card 136.

Although the example shown in FIG. 9b depicts the use of multiple filters per line card 136, a similar concept could be applied to filters associated with express channels 127. In that case, converters 149 could be eliminated so that optical signals output from optical switch 153 pass to wavelength division multiplexer/demultiplexer 110 from optical link 127.

FIG. 9c is a block diagram showing yet another mechanism operable to reduce switching delay of router 112 without modifying the switching speed of individual switching components. This example implements a plurality of tunable lasers 146a1-146ax associated with each line card 136.

While one of optical transmitters 146a1-146ax generates an optical router signal having one particular wavelength, other transmitters 146a2-146ax can be retuned to another wavelength to communicate packets bound for other destinations. By switching between the multiple parallel transmitters 146a1-146ax, switching delay that might otherwise be caused when waiting for transmitters 146 to retune can be reduced or avoided.

In the illustrated embodiment, a splitter 143 receives electrical signal 129a from processor 136 and communicates a portion 129a1-129ax to each of transmitters 146a1-146ax, respectively. At least one of transmitters 146a1 generates an optical router signal at a specified wavelength. Other transmitters 146a2-146ax can retune without emitting light during the time that active transmitter 146a1 generates the optical signal. For example, where optical transmitters 146 comprise multiple stage lasers including tuning stages and lasing stages, the lasing stages of those transmitters can remain inactive while tuning stages adjust to process a new wavelength.

A switch 155 selects an appropriate optical router signal from lasers 146a and communicates that signal to switching fabric 140. In one embodiment, switch 155 can sequentially cycle between signals received from transmitters 146a1-146ax. A variety of control algorithms can be used to determine an active transmitter 146a. For example, switch 155 could receive a control signal instructing switch 155 as to which transmitter output to accept and communicate to switch fabric 140.

Each of the efficiency enhancing mechanisms described with respect to FIGS. 4 and 5 could be used independently or in combination with one, some, or all others of those mechanisms to further enhance operation of the router.

FIG. 10 is a flow chart illustrating one example of a method 400 of routing optical signals. For the purposes of illustration, method 400 will be described with reference to router 112 shown in FIG. 2. Method 400, however, could equally apply to alternative router designs, such as router 212 shown in FIG. 3 including enhancements shown in FIGS. 8 and/or 9. Method 400 begins at step 405 where line card 130a receives a first packet 128a comprising an identifier of a destination element.

Processor 136a of line card 130a converts at least the identifier portion of first packet 128a to an electronic format. Processor 136a applies the identifier to look-up table 144a to determine control signal 162a at step 410. In this example, control signal 162a instructs a particular tunable filter, for example, filter 148n to tune to a wavelength transmitted by transmitter 146a of first line card 130a. Alternatively, processor 136a could communicate control signal 162 to scheduling engine 164 to facilitate scheduling and arbitration among control signals 162 before transmitting those signals to filters 148.

The identification of a destination tunable filter 148 could comprise identification of a plurality of tunable filters operating in parallel to service a single optical link and/or line card. Embodiments discussed with respect to FIGS. 9a-9b provide examples of this type of operation. In this manner, one of the filters 148 can process the optical signal while other filters in that group retune to or from other wavelengths. This can help to enhance the effective switching speed of router 112.

Transmitter 146a generates an optical router signal 152a and communicates that signal to star coupler switch fabric 140 at step 415. In a particular embodiment, transmitter 146a comprises a fixed wavelength transmitter operable to generate optical router signal 152a at a particular fixed wavelength. Generating optical router signal 152 could comprise, for example, generating optical router signal 152 using a laser/modulator combination residing on the same line card. In another example, a modulator 393 resident on line card 130a could receive from common bay equipment (see e.g., FIG. 7) an unmodulated optical signal having a particular wavelength. Modulator 393 could modulate information onto the unmodulated signal to generate optical router signal 152.

The process by which transmitter 146a generates optical router signal 152a depends, in part, on the level of conversion experienced by incoming packet 128a. Where processor 136a converts the entire optical signal 128a into an electronic format, transmitter 146a information for the entire optical signal including header and payload information for optical router signal 152a. Where, on the other hand, processor 136a converts only a portion of optical signal 128a, transmitter 146a merely converts that portion of the signal back to an optical signal, and recombines that portion with the original optical portion of signal 128a to form optical router signal 152a. As a particular example, processor 136a may convert only a header portion, or only the identifier portion of a header portion of signal 128a to an electronic format, while temporarily storing or delaying the remainder of optical signal 128a until it can be combined with an optical signal leaving transmitter 146a.

Generation of optical router signal 152a may include aggregating individual packets 131 into larger frames 133 and/or may include reducing the duration of each packet by implementing a speed-up mechanism such as that described with respect to FIG. 8a.

Star coupler switching fabric 140 receives the first optical router signal 152a and at least one other optical router signal 152b having a wavelength that is different than first optical router signal 152a, and communicates both optical router signals 152a to a plurality of tunable filters 148 at step 420. In this example, tunable filter 148n is associated with a line card coupled to an optical path facilitating communication with the destination network element. In this case, router 112 communicates control signal 162 to tunable filter 148n at step 425.

Based at least in part on control signal 162a, filter 148n associated with line card 130n tunes to the wavelength associated with optical router signal 152a. As a result, filter 148n accepts the first packet carried by optical router signal 152a at step 430 and facilitates communication of the first packet toward the destination element. Tunable filter 248n comprises a tunable optical filter operable to selectively accept one or more specified wavelengths while rejecting others. Filter 148n may communicate the first packet toward the destination element without further conversion, or may pass optical router signal 152a to an optical-to-electrical converter 149n to facilitate additional processing before communicating the first packet toward the destination network element.

FIG. 11 is a flow chart showing one example of a method 350 of scheduling communications through a star switching fabric. Method 350 will be described with respect to scheduling mechanism 300 shown in FIG. 5a. Method 350 could apply, however, to any scheduling mechanism described herein.

Method 350 begins at step 355, where scheduler 300 receives a plurality of packets having a first load distribution. Scheduler 300 could receive, for example a plurality of packets in an optical format, where each packet is associated with a wavelength. Typically, packet-based traffic will exhibit a non-uniform load distribution.

In this particular example, scheduling star switching fabric 340 of scheduler 300 receives packets 252a-252n, and communicates a substantially similar set of at least some of packets 252 toward each of a plurality of filters 348 at step 360. In this example, filters 348 each comprises a tunable filter operable to selectively tune to a wavelength to be passed. Alternatively, filters 348 could comprise fixed-wavelength filters used in combination with tunable wavelength optical transmitters, such as transmitters 346 shown in FIG. 5b.

Scheduler 300 selectively passes packets associated with selected wavelengths for receipt by transmission star switching fabric 240 at step 365. In this example, under the direction of scheduling engine 364, filters 348 selectively tune to alternating wavelengths in a round robin fashion to ensure that no one particular wavelength overwhelms transmission switching fabric 240. The result of the selective alternate tuning of filters 348 culminates in a more uniform load at the input to transmission star switching fabric 240.

As a result, scheduler 300 schedules communication of packets from transmission switching fabric 240 at step 370 using a trivial scheduling algorithm. Scheduler 300 may implement, for example, a round robin algorithm for scheduling tuning of selectable elements, such as filters 248, associated with transmission star switching fabric 240. By establishing a more uniform load at the input to transmission star switching fabric 240, scheduler 300 avoids the 1/N delay penalty that would otherwise be associated with using a trivial scheduling algorithm on non-uniform traffic.

FIGS. 12-16 are flow charts illustrating example methods of enhancing the effective switching speed of a router utilizing a star switching fabric without increasing switching speed of the individual switching components of the router. For brevity of description, the following methods will be described with reference to router 112 depicted in FIG. 2. The methods described with respect to FIGS. 12-16 could, however, apply to any router design utilizing a star switching fabric, and are not intended to be limited only to the example router embodiments explicitly described herein.

Figure 12:
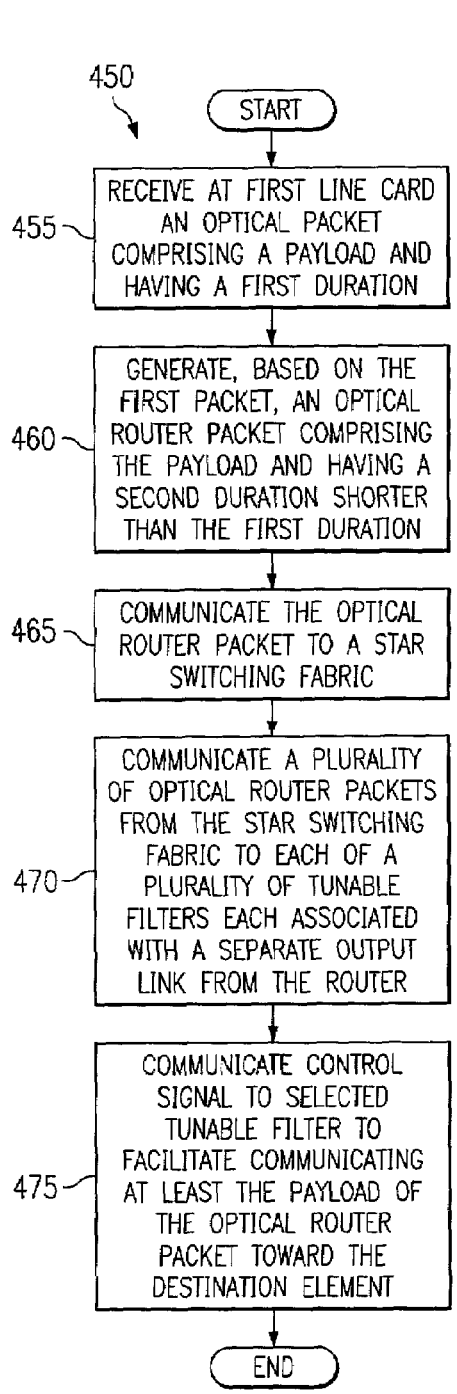
FIG. 12 is a flow chart illustrating one example of a method of enhancing the effective switching speed of an optical router by reducing the duration of packets communicated through a star switching fabric of the router.

FIG. 12 is a flow chart illustrating one example of a method 450 of enhancing the effective switching speed of router by reducing the duration of packets communicated through a star switching fabric of the router. Method 450 begins at step 455 where router 112 receives at a first line card 130 an optical packet comprising a payload and having a first duration. Referring to FIG. 8a, optical packet 131 may comprise a duration of, for example, 50 nanoseconds. Line card 130 generates at step 460, an optical router packet 133 having a second duration shorter than the first duration. Optical router packet 133 comprises the payload of optical packet 131 received by line card 130, and comprises a second duration shorter than the first duration associated with packet 131. In this particular example, the second duration of packet 133 comprises approximately one half the duration of input packet 131.

Line card 130 communicates the optical router packet 133 to star switching fabric 140 at step 465. Star switching fabric 140 communicates at step 470 a plurality of optical router packets to each of a plurality of tunable filters 148. Each tunable filter 148 is associated with a separate output link from router 112. Router 112 communicates at step 475 a control signal 162 to a selected tunable filter 148 to facilitate communicating at least the payload of the optical router packet 133 toward the destination element associated with that packet. The control signal 162 causes tunable filter 148 to tune to a wavelength associated with optical packet 133, and to substantially communicate packet 133 toward a destination element associated with that optical filter 148. Prior to communicating optical packet 133 from router 112, router 112 may expand the duration of packet 133 to recover its original duration.

By reducing the duration of packets received at line cards 130, router 112 can increase switching speed and throughput associated with the router without modifying the switching speeds of any particular switching components in router 112.

Figure 13:
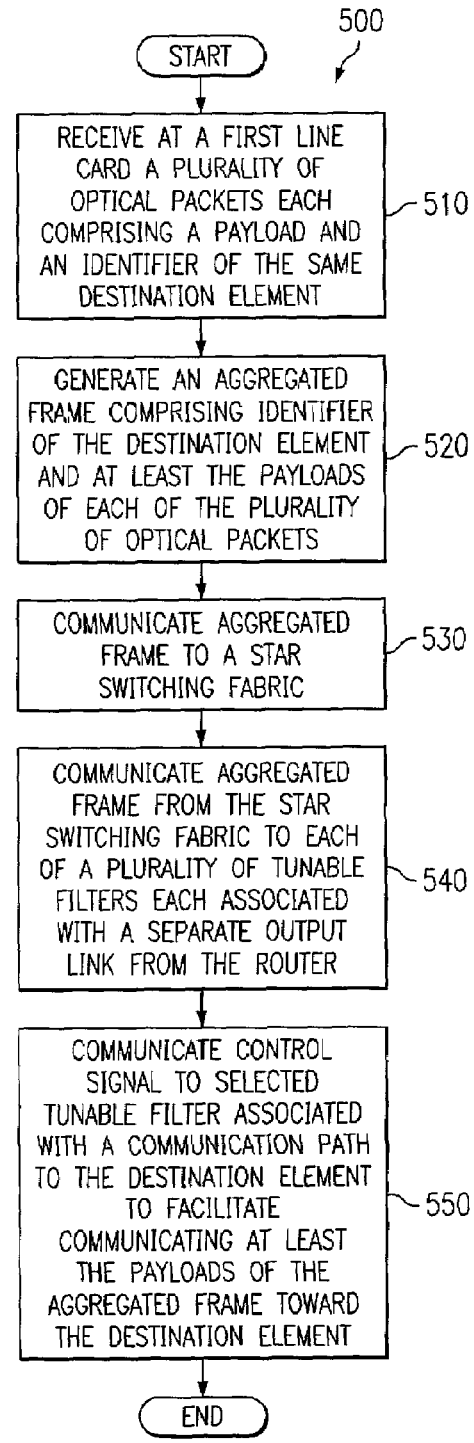
FIG. 13 is a flow chart showing one example of a method of enhancing the effective switching speed of an optical router by aggregating packets bound for a common output communication path.

FIG. 13 is a flow chart showing one example of a method 500 of enhancing the effective switching speed of an optical router by aggregating packets bound for a common destination element. Method 500 begins at step 510 where router 112 receives a plurality of optical packets each comprising a payload and each comprising an identifier of the same destination element. Referring to FIG. 8b, router 112 generates at step 520 an aggregated frame 137 comprising an identifier 139 of the destination element shared by packets 131a-131n.

Router 112 communicates at step 530 aggregated frame 137 to star switching fabric 140. In this example, star switching fabric 140 communicates at step 540 aggregated frame 137 to each of a plurality of tunable filters 148. Each tunable filter is associated with a separate output link from router 112. Alternatively, aggregated frames 137 could be generated by tunable optical transmitters and communicated to a plurality of fixed wavelength filters through star switching fabric 140.

In the illustrated example, router 112 communicates a control signal to at least a selected tunable filter 148 at step 550. The selected tunable filter 148 is associated with a communication path to a destination element for each of the optical packets 131a-131n within aggregated frame 137. The selected tunable filter 148 receives a control signal and tunes to a wavelength associated with aggregated frame 137, facilitating communication of aggregated frame 137 toward the destination element. A line card 130 associated with the output link 128 leading to the destination element may disassemble aggregated frame 137 to facilitate communication of individual packets 131a-131n toward the destination element.

Figure 14:
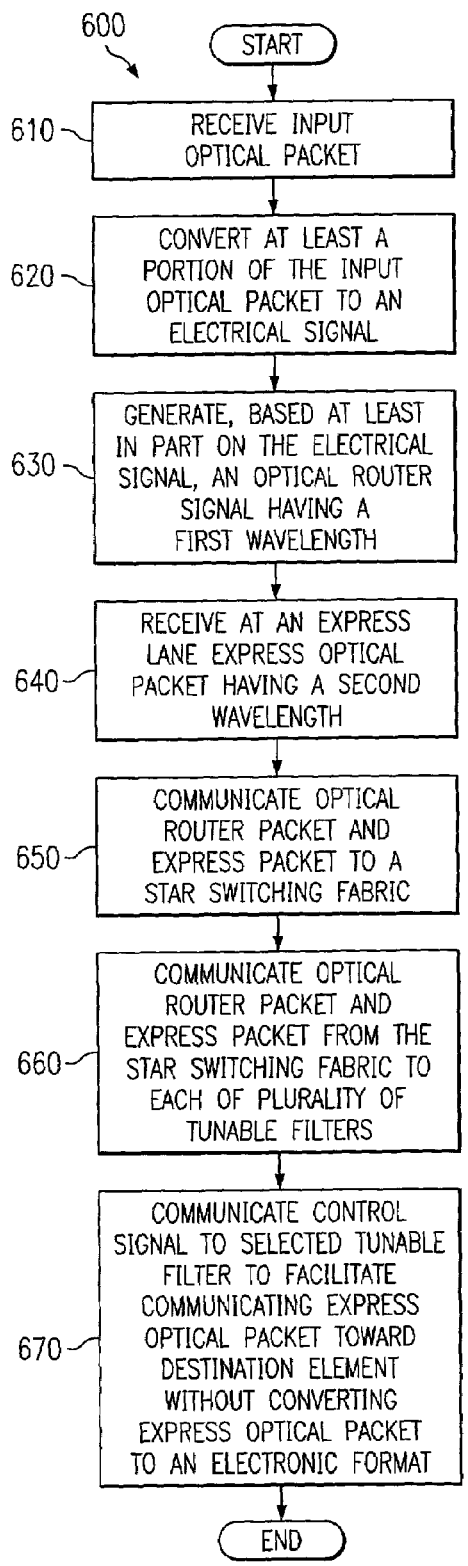
FIG. 14 is a flow chart showing one example of a method of enhancing the effective switching speed of an optical router using a star switching fabric by providing express lanes that bypass line cards performing electronic signal processing of some of the optical signals received.

FIG. 14 is a flow chart showing one example of a method 600 of enhancing the effective switching speed of an optical router using a star switching fabric by providing express lanes that bypass line cards that facilitate electronic signal processing of some of the optical signals received. Method 600 begins at step 610 where router 112 receives an input optical packet at optical link 128. A line card 130 converts at least a portion of the optical packet received to an electronic form at step 620. Line card 130 generates, based at least in part on the electronic signal, an optical router signal having a first wavelength at step 630.

Router 112 also receives at an express lane 127 an express optical packet having a second wavelength at step 640. Router 112 communicates at step 650 the optical router packet generated at line card 130 and the express packet received at express lane 127 to star switching fabric 140. Star switching fabric 140 communicates the optical router packet and the express packet to each of a plurality of tunable filters at step 660. Router 112 communicates a control signal to a selected tunable filter at step 670 to facilitate communicating the express optical packet toward a destination element associated with that filter. The express optical packet is communicated from an input to router 112, through switching fabric 140, to an output of router 112 without ever having been converted to an electronic form. Facilitating bypassing line cards 130 depending, for example, on the wavelength of the optical packets received, can provide significant efficiencies. Packets that do not require electronic processing can transparently pass through router 112, saving system resources and reducing delay that would otherwise accompany having to convert all packets received between optical and electrical formats.

Again, although this example discusses the use of tunable filters and fixed wavelength transmitters, the concepts also apply to embodiments utilizing tunable optical transmitters and fixed wavelength filters.

Figure 15:
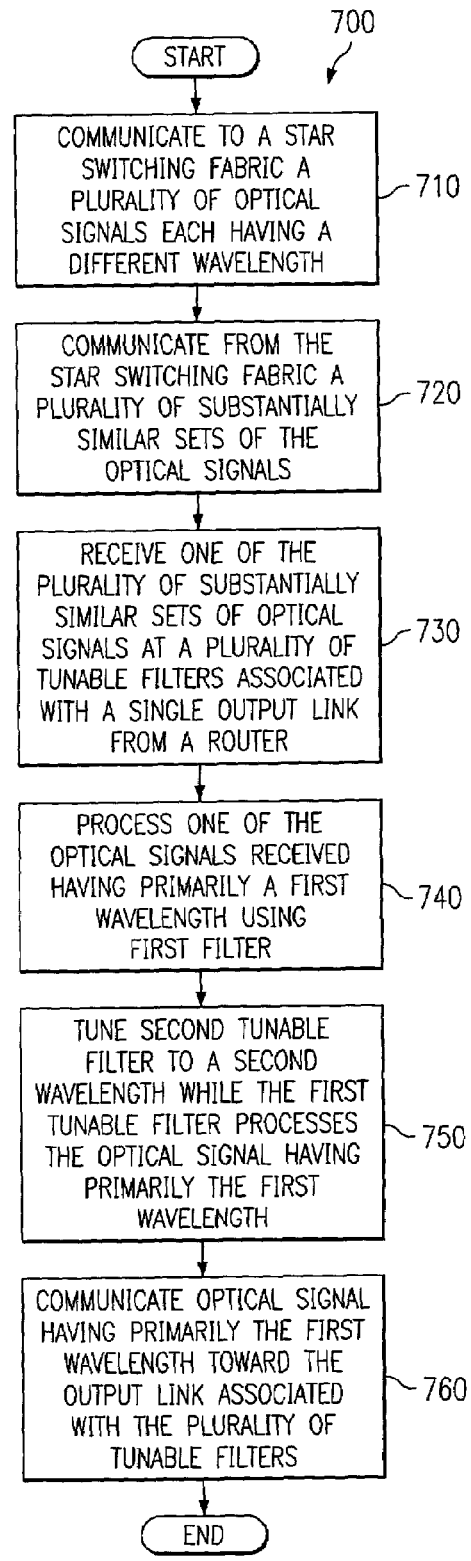
FIG. 15 is a flow chart showing one example of a method for enhancing the effective switching speed of an optical router using a star switching fabric by assigning a plurality of tunable filters to each output link from the router.

FIG. 15 is a flow chart showing one example of a method 700 for enhancing the effective switching speed of an optical router using a star switching fabric by assigning a plurality of tunable filters to each output link from the router. Method 700 begins at step 710 where router 112 receives at star switching fabric 114 a plurality of optical signals each having a wavelength. Although some of the optical signals may have the same wavelengths, at least some of the signals received have different wavelengths from other signals received. Star switching fabric 140 communicates at step 720 a plurality of substantially similar sets of the optical signals. In some embodiments, each of the substantially similar sets of optical signals may comprise a combination of all signals received by the star switching fabric 140. In other embodiments, star switching fabric 140 may communicate only some of the optical signals received.

A group of tunable filters 148 associated with a common output from router 112 receives one of the plurality of substantially similar sets of optical signals at step 730. Referring for example to FIG. 9a, a first tunable filter 148a1 of the group of tunable filters associated with the output link is tuned to a first wavelength to process one of the optical signals received having primarily the first wavelength at step 740. While the first filter 148a1 processes the optical signal primarily comprising the first wavelength, a second tunable filter 148an of the same group tunes to a second wavelength at step 750. In a particular embodiment, the second tunable filter 148an can substantially complete tuning to the second wavelength before the first tunable filter 148a1 completes processing the optical signal having primarily the first wavelength.

Router 112 communicates the optical signal having primarily the first wavelength from first tunable filter 148a1 to an output link associated with that filter at step 760. Subsequently, the group of tunable filters, and in particular, second tunable filter 148an tuned to the second wavelength may receive another set of optical signals and facilitate communication of an optical signal comprising primarily the second wavelength toward the output link associated with that group of filters.

Assigning a plurality of tunable filters to a single output link allows router 112 to conceal delay that would otherwise be associated with having to retune filters to process different wavelength signals. Using a multiple filter configuration, router 112 can conceal delay by reconfiguring one filter associated with the output link while another filter associated with that same output link processes signals being received.

Figure 16:
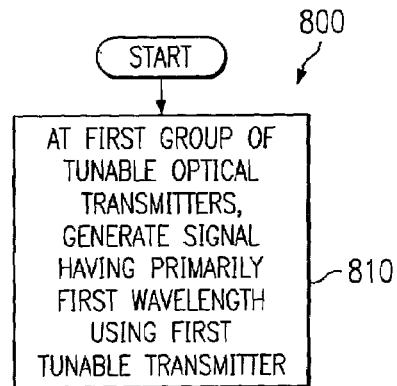
FIG. 16 is a flow chart showing one example of a method of enhancing the effective switching speed of an optical router using a star switching fabric by assigning a plurality of tunable transmitters to an input link to the optical router.

FIG. 16 is a flow chart showing one example of a method 800 of reducing delay by assigning a plurality of tunable transmitters to an input link to the router. In this example, method 800 beings at step 810 where a first tunable transmitter of a group of tunable transmitters associated with a single input to the router generates an optical router signal having primarily a first wavelength. Referring to FIG. 8c for exemplary purposes, while first transmitter 146a1 generates the optical router signal having primarily the first wavelength, a second tunable transmitter 146an tunes to a second wavelength at step 820. In a particular embodiment, second tunable transmitter 146an substantially completes tuning to the second wavelength before first tunable transmitter 146a1 completes generation of the first optical router signal. This process can be repeated at multiple groups of tunable transmitters, each group associated with one input to router 112.

Router 112 communicates at step 830 a signal from each of the groups of tunable transmitters to star switching fabric 140. Star switching fabric 140 communicates substantially similar sets of optical signals received to each of a plurality of filters. In this particular example, each of the filters comprises a fixed wavelength filter operable to substantially communicate a predetermined wavelength or range of wavelengths and to reject other wavelengths. Each filter can be associated with an output from router 112. Router 112 can facilitate selectively directing signals through switching fabric 140 by selectively tuning transmitters 146 to wavelengths of filters associated with desired output links from router 112. Like the method implementing multiple tunable filters for each output link, using multiple tunable transmitters for each input link conceals delay otherwise associated with reconfiguring tunable lasers of router 112.

In various embodiments, one or more switching time enhancing techniques, such as those described in FIGS. 12-16 can be combined to further increase the switching time of the router.

Although various aspects of the present invention have been described in several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. In a communication system comprising a plurality of line cards coupled to a star switching fabric, a method of routing optical signals, comprising:
receiving at a first line card a first optical packet comprising a payload and having a first duration;
generating, based on the first packet, an optical output packet comprising the payload and having a second duration shorter than the first duration, the optical output packet having a first wavelength and wherein the optical output packet comprises a substantially continuous spectrum centered at the first wavelength;
communicating the optical output packet to a star switching fabric;
communicating the optical output packet from the star switching fabric to each of a plurality of filters each associated with a separate output link from the communication system; and
communicating a control signal to at least a selected filter associated with a communication path to a destination element, the control signal operable to cause the selected filter to accept the optical output packet and to facilitate communicating at least the payload of the optical output packet toward the destination element, wherein the control signal is centered at the first wavelength.

2. The method of claim 1, further comprising:
receiving the optical output packet from the selected filter;
generating a return optical packet having a second wavelength; and
communicating the return optical packet from the destination element to the star switching fabric.

3. The method of claim 1, wherein the filters comprise tunable filters.

4. The method of claim 1, wherein the communication system comprises a router.

5. In a network comprising a plurality of line cards coupled to a star communication fabric, a method of transmitting optical signals, comprising:
receiving at a first line card a first packet comprising a payload and having a first duration;
generating, based at least in part on the first packet, an optical network packet comprising the payload and having a second duration shorter than the first duration, the optical network packet having a first wavelength and wherein the optical network packet comprises a substantially continuous spectrum centered at the first wavelength;
communicating the optical network packet to a star communication fabric;
communicating the optical network packet from the star communication fabric to each of a plurality of filters each associated with a separate output link from the network;
communicating a control signal to at least a first filter associated with a communication path to a destination element, the control signal operable to cause the selected filter to accept the optical network packet and to facilitate communicating at least the payload of the optical network packet toward the destination element, wherein the control signal is centered at the first wavelength;
communicating a message from a transmitter at the destination element to the star communication fabric, the message having a second wavelength; and
communicating at least a portion of the message from the star communication fabric to a second filter associated with a communication path to the first line card, wherein the second filter accepts the message and facilitates communicating the portion of the message to the first line card.

6. The method of claim 5, wherein the star communication fabric comprises one or more power splitters.

7. The method of claim 6, wherein the one or more power splitters separate an input optical signal into sixteen (16) or more outgoing signals.

8. The method of claim 5, wherein the destination element comprises a plurality of receivers.

9. The method of claim 5, wherein the optical network packet comprises an Internet Protocol (IP) packet or a Transmission Control Protocol (TCP) packet.

10. The method of claim 5, wherein the control signal is based on a round robin scheduling algorithm.

11. The method of claim 5, wherein the first line card comprises at least a second transmitters and wherein the second transmitter communicates a different center wavelength than the first and second wavelengths and wherein the second transmitter communicates with a third duration that is different than the first or second duration.

12. The method of claim 11, further comprising an optical amplifier operable to amplify at least the different center wavelength from the second transmitter.

* * * * *